(12) United States Patent
Zhou et al.

(10) Patent No.: US 12,529,084 B2
(45) Date of Patent: Jan. 20, 2026

(54) **METHOD FOR PRODUCING PHYCOCYANOBILIN USING A RECOMBINANT *ESCHERICHIA COLI***

(71) Applicant: Jiangnan University, Wuxi (CN)

(72) Inventors: Jingwen Zhou, Wuxi (CN); Jian Chen, Wuxi (CN); Yuqi Wang, Wuxi (CN); Sha Xu, Wuxi (CN); Weizhu Zeng, Wuxi (CN)

(73) Assignee: Jiangnan University, Wuxi (CN)

( * ) Notice: Subject to any disclaimer, the term of this patent is extended or adjusted under 35 U.S.C. 154(b) by 228 days.

(21) Appl. No.: 18/428,893

(22) Filed: Jan. 31, 2024

(65) Prior Publication Data
US 2024/0301454 A1     Sep. 12, 2024

(30) Foreign Application Priority Data
Feb. 10, 2023 (CN) .......................... 202310095539.9

(51) Int. Cl.
*C12P 17/16* (2006.01)
*C12N 9/02* (2006.01)
*C12N 15/70* (2006.01)

(52) U.S. Cl.
CPC ............ *C12P 17/165* (2013.01); *C12N 9/001* (2013.01); *C12N 9/0071* (2013.01); *C12N 15/70* (2013.01); *C12Y 103/07005* (2013.01); *C12Y 114/14* (2013.01); *C12N 2800/101* (2013.01)

(58) Field of Classification Search
CPC .......... C12Y 103/07005; C12N 9/0071; C12N 15/70
See application file for complete search history.

(56) References Cited

U.S. PATENT DOCUMENTS

2003/0027285 A1*   2/2003   Glazer ............. C07K 14/43595
                                                                435/69.6

* cited by examiner

*Primary Examiner* — Tekchand Saidha
(74) *Attorney, Agent, or Firm* — Lili Chen

(57) ABSTRACT

Disclosed is a method for producing phycocyanobilin by use of a recombinant *Escherichia coli* that express heterologous heme oxygenase ho1 and ferredoxin oxidoreductase pcyA derived from *Synechocystis* sp. PCC6803. According to the present disclosure, heterologous expression of ho1 and pcyA genes leads to conversion of heme to an intermediate biliverdin for phycocyanobilin synthesis, and reduces the accumulation of biliverdin in the process of the phycocyanobilin synthesis. The genome of *E. coli* is further engineered to overexpress related genes of a metabolic pathway of phycocyanobilin, and a strain of recombinant *E. coli* with high yield of phycocyanobilin is obtained. The recombinant *E. coli* strain is cultured for 36 hr in a system using glycerol as a substrate, and the phycocyanobilin yield can reach 147 mg/L.

15 Claims, 6 Drawing Sheets

Specification includes a Sequence Listing.

```
                           SEQUENCE LISTING

Sequence total quantity: 60
SEQ ID NO: 1           moltype = DNA  length = 723
FEATURE                Location/Qualifiers
source                 1..723
                       mol_type = other DNA
                       organism = synthetic construct
SEQUENCE: 1
atgagcgtta acctggcgag ccagctgcgt gaaggcacca aaaaatctca ctctatggcg   60
gaaaacgttg gtttcgttaa atgcttcctg aaaggtgttg ttgagaaaaa cagctaccgt  120
aaactggttg gtaacctgta cttcgtttac agcgcgatgg aagaagaaat ggcgaaattc  180
aaagatcacc cgatcctgtc tcacatctac ttcccggaac tgaaccgtaa acagtctctg  240
gaacaggatc tgcagttcta ctatggtagc aactggcgtc aggaagttaa aatctctgcg  300
gcgggtcagg cgtacgttga tcgcgttcgt caggttgcgg cgaccgcgcc ggaactgctg  360
gttgcgcaca gctacacccg ttacctgggc gatctgagcg gcggccagat cctgaagaaa  420
atcgcgcaga acgcgatgaa cctgcacgat ggtggcaccg cgttctacga attcgcagat  480
atcgatgatg aaaaagcgtt caaaaacacc taccgtcagg ctatgaacga tctgccgatc  540
gatcaggcga ccgcggaacg tatcgttgat gaagcgaacg atgcgttcgc gatgaacatg  600
aaaatgttca acgaactgga aggtaacctg atcaaagcga tcggcatcat ggttttcaac  660
tctctgaccc gtcgtcgtag ccagggcagc accgaagttg gtctggcgac tctgaaggc   720
taa                                                                723

SEQ ID NO: 2           moltype = DNA  length = 747
FEATURE                Location/Qualifiers
source                 1..747
                       mol_type = other DNA
                       organism = synthetic construct
SEQUENCE: 2
atggcggtta ccgatctgtc tctgaccaac agcagcctga tgccgaccct gaacccgatg   60
atccagcagc tggcgctggc gatcgcggcg tcttggcaga gcctgccgct gaaaccgtac  120
cagctgccgg aagatctggg ttacgttgaa ggccgtcgtg aaggtgaaaa actggttatc  180
gaaaaccgtt gctaccagac cccgcagttc cgtaaaatgc acctggaact ggcaaaagtg  240
ggcaaaggtc tggatatcct gcactgcgtt atgttcccgg aaccgctgta cggcctgccg  300
ctgttcggtt gcgatatcgt tgcgggtccg ggtggtgtta gcgcggctat cgcggatctg  360
tctccgaccc agtctgatcg tcagctgccg gcggcgtacc agaaatctct ggcggaactg  420
ggtcagccgg aattcgaaca gcagcgtgaa ctgccgccgt ggggtgaaat cttctctgaa  480
tactgcctgt tcattcgtcc gtctaacgtt accgaagaag aacgtttcgt tcagcgtgtt  540
gttgatttcc tgcagatcca ctgccaccag agcatcgtgg cggaaccgct gagcgaagcg  600
cagaccctgg aacaccgtca gggccagatc cactactgcc agcagcagca gaaaaacgat  660
aaaacccgtc gtgttctgga aaaagcgttc ggcgaagcgt gggcggaacg ttacatgtct  720
caggttctgt tcgatgttat ccagtaa                                      747

SEQ ID NO: 3           moltype = DNA  length = 198
FEATURE                Location/Qualifiers
source                 1..198
                       mol_type = other DNA
                       organism = synthetic construct
SEQUENCE: 3
ggtggtggtg gttcaggtgg tggtggttca ggtggtggtg gttgtggtag cctgcgtgaa   60
tgtgaactgt atgttcagaa acataatatt caggccctgc tgaaagatag cattgttcag  120
ctgtgtaccg cacgtccgga acgtccgatg gcatttctgc gcgaatattt tgaacgtctg  180
gaaaagaag aagccaaa                                                 198

SEQ ID NO: 4           moltype = DNA  length = 108
FEATURE                Location/Qualifiers
source                 1..108
                       mol_type = other DNA
                       organism = synthetic construct
SEQUENCE: 4
ggtggtggtg gttcaggtgg tggtggttca ggtggtggtg gttgtggtct ggaacagtat   60
gcaaatcagc tggcagatca gattatcaaa gaagcaaccg aaggttgc              108

SEQ ID NO: 5           moltype = DNA  length = 3122
FEATURE                Location/Qualifiers
```

| source | 1..3122 |
| --- | --- |
| | mol_type = other DNA |
| | organism = synthetic construct |

SEQUENCE: 5

```
taatacgact cactataggg gaattgtgag cggataacaa ttcccctgta gaaataattt   60
tgtttaactt taataaggag atataccatg gtacagact taatccaacg ccctcgtcgc  120
ctgcgcaaat ctcctgcgct gcgcgctatg tttgaagaga caacacttag ccttaacgac  180
ctggtgttgc cgatctttgt tgaagaagaa attgacgact acaaagccgt tgaagccatg  240
ccaggtgtga tgcgcattcc agagaaacat ctggcacgcg aaattgaacg catcgccaac  300
gccggtattc gttccgtgat gactttcggc atctctcacc ataccgatga aaccggcagc  360
gatgcctggc gggaagatgg actggtggcg cgaatgtcgc gcatctgcaa gcagaccgtg  420
ccagaaaatga tcgtcatgtc agacacctgc ttctgcgaat acacatctca cggtcactgc  480
ggtgtgctgt gcgagcatgg cgtcgacaac gacgcgactc tggaaaattt aggcaagcaa  540
gccgtggttg cagctgctgc aggcgcagac ttcatcgccc cttctgccgc gatggacggc  600
caggtacagg cgattcgcca ggcgctggac gctgcgggcc ttaaagatac ggcgattatg  660
tcgtattcga ccaagttcgc ctcttccttt tatggtccgt tccgtgaagc tgccggaagc  720
gcattaaaag gcgaccgcaa aagctatcag atgaacccaa tgaaccgtcg tgaggcgatt  780
cgtgagtcac tgctggatga agcccagggc gcagactgtc tgatggttaa acctgccgga  840
gcgtacctcg acatcgtgcg tgagctgcgt gaacgtactg aattgccgat tggcgcgtat  900
caggtgagcg tgagtacgc gatgattaag ttcgccgcgc tggcgggtgc tatagatgaa  960
gagaaagtcg tgctcgaaag cttaggttca attaagcgtg cgggtgcgga tctgattttc 1020
agctactttg cgatggattt ggctgagaag aagattctgc gttaaggatc cgaattcgag 1080
ctcggcgcgc ctgcaggtcg acaagcttgc ggccgcataa tgcttaagtc gaacagaaag 1140
taatcgtatt gtacacggcc gcataatcga aattaatacg actcactata ggggaattgt 1200
gagcggataa caattcccca tcttagtata ttagttaagt ataagaagga gatatacata 1260
tgttagacaa tgtttttaaga attgccacac gccaaagccc acttgcactc tggcaggcac 1320
actatgtcaa agacaagttg atggcgagcc atccgggcct ggtcgttgaa ctggtaccga 1380
tggtgacgcg cggcgatgtg attcttgata cgccgctggc gaaagtaggc ggaaaaggct 1440
tatttgttaa agagctggaa gtcgcgctcc tcgaaaatcg cgccgatatc gccgtacatt 1500
caatgaaaga tgtgccggtt gaattcccgc aaggtctgga ctgcccgcac acact atttgtgagc 1560
gtgaagatcc tcgcgatgcc tttgtgtcca ataactgatga caatctggat gcgttaccgg 1620
caggcagtat cgtcgggacg tccagtttac gtcgccagtg ccaactggct gaacgccgcc 1680
cggatctgat tatccgctcc ctgcgaggca acgtcggcac tcgcctgagt aaactggata 1740
acggcgaata cgatgccatc attcttgcgg tagccggact aaaacgttta ggtctggagt 1800
cccgcattcg cgccgcattg ccacccgaga tttctcttcc ggcggtagga caaggtgcgg 1860
tgggtattga atgccgcctt gatgattctc gcactcgcga gctgcttgcc gcgctgaatc 1920
accacgaaac tgcactgcgc gttacgcag aacgcgccat gaatacccgt ctcgaaggcg 1980
gatgtcaggt gccaattggt agctacgccg agcttattga tggcgaaatc tggctgcgtg 2040
cgttggtcgg cgcgccggac ggttcgcaga ttattccggg tgaacgccgc ggtgcgcgcg 2100
aagatgccga acaaatgggg atttcgctgg cagaagagct actgaataac ggcgcgcgcg 2160
agatcctcgc tgaagtctat aacggagacg ctccggcatg aagatctata aaggaggaa 2220
aatatatgag tatcctggtc acccgcccgt ctcccgctgg agaagagtta gtgagccgtc 2280
tgcgcacact gggcaggtg gcctggcatt ttccactgat tgagttttct ccgggtcgga 2340
aattaccaca acttgctgat caactggcgg cgctggggga gagcgatctg ttgtttgccc 2400
tctcgcaaca cgcggttgct tttgcccaat cacagctgca tcagcaagat cgtaaatggc 2460
cccgactacc tgattattc gccattggac gcaccaccgc actggcacta cataccgtaa 2520
gcggacagaa gattctctac ccgcaggatc gggaaatcga caagtcttg ctacaattac 2580
ctgaattaca aaatattgcg ggcaaacgtg cgctgatatt acgtggcaat ggcggtcgtg 2640
agctaattgg ggatacccctg acggcgcgcg tgctgaggt cacttttgt gaatgttatc 2700
aacgatgcgc aatccattac gatggtgcag aagaagcgat gcgctggcaa tcccgcgagg 2760
tgacgacggt cgttgttacc agcggtgaaa tgttgcagaa atctgggtcg ctgatcccac 2820
aatggtatcg tgagcactgg ttactacact gtcgactatt ggtcgtcagt gagcgtttga 2880
cgaaactcgc ccgggaactg gctggcaag acattaaggt cgccgataac gctgacaacg 2940
atgcgcttt acgggcatta caataactcg agtctggtaa agaaaccgct gctgcgaaat 3000
ttgaacgcca gcacatggac tcgtctacta gcgcagctta attaacctag gctgctgcca 3060
ccgctgagca ataactagca taaccccttg ggcctctaa acgggtcttg aggggttttt 3120
tg                                                                3122
```

| SEQ ID NO: 6 | moltype = DNA  length = 4228 |
| --- | --- |
| FEATURE | Location/Qualifiers |
| source | 1..4228 |
| | mol_type = other DNA |
| | organism = synthetic construct |

SEQUENCE: 6

```
gatctcgacg ctctccctta tgcgactcct gcattaggaa gcagcccagt agtaggttga   60
ggccgttgag caccgccgcc gcaaggaatg gtgcatgcaa ggagatggcg cccaacagtc  120
ccccggccac ggggcctgcc accataccca cgccgaaaca agcgctcatg agcccgaagt  180
ggcgagcccg atcttcccca tcggtgatgt cggcgatata ggcgccagca accgcacctg  240
tggcgccggt gatgccggcc acgatgcgtc cggcgtagag gatcgagatc gatctcgatc  300
ccgcgaaatt aatacgactc actatagggg aattgtgagc ggataacaat tcccctctag  360
aaataatttt gtttaacttt aagaaggaga tataccatgg taccgaact taaaaacgat  420
cgttatctgc gggcgctgct cgccagccc gttgatgtca ctccagtatg atgatgcgc  480
caggcgggtc gctatctacc ggaatataaa gccacgcgcg cccaggcggg cgattttatg  540
tcgctgtgca aaaacgccga gctgcgtgca gaagtgactt cgaaccgct gcgtcgctaa  600
ccgctgatg cggcgatcct ctttccgat atcctcaccg tgccgacgc gatgggggtta  660
gggctctatt ttgaagccgg agaaggtccg cgttttacct cgccagtcac ctgcaaagcc  720
gacgtcgata aactgccaat tccggacccg gaagatgagc tgggttacgt gatgaacgcg  780
gtgcgtacca ttcgtcgcga actgaaaggc gaagtgccgc tgattggttt tccggcagc  840
ccgtggacgc tggcgaccta catggtgaa ggcggcagca gcaaagcgtt caccgtgatc  900
```

```
aaaaaaatga tgtatgccga tccgcaggcg ctgcacgctc tactcgataa actggcgaaa   960
agcgtcactt tgtatctgaa tgcgcagatt aaagccggtg ctcaggcagt gatgattttc  1020
gacacctggg gcggtgtgct taccgggcgc gattatcaac agttctcgct ctattacatg  1080
cataaaattg ttgatggttt actgcgtgaa acgacggtc gccgcgtacc ggtcacgctg   1140
tttaccaaag gcggcggaca gtggctggga gcgatgcgaa aaaccggttg cgatgcgttg  1200
ggcctcgact ggacaacgga tatcgccgat gcgcgccgcc gtgtgggcaa taaagtcgcg  1260
ttgcagggta atatggatcc gtcgatgctg tacgctccgc ctgcccgcat tgaagaagaa  1320
gtagcgacta tacttgcagg tttcggtcac ggcgaaggtc atgtctttaa ccttggtcac  1380
ggcattcatc aggatgtgcc gccagaacat gctggcgtat tcgtggaggc agtgcatcga  1440
ctgtctgaac aatatcaccg ctaagagctc ataaaaggag gaaaatatat gaaacccgac  1500
gcacaccagg ttaaacagtt tctgctcaac cttcaggata cgatttgtca gcagctgacc  1560
gccgtcgatg gcgcagaatt tgtcgaagat agttggcagc gcgaagctgg cggcggcggg  1620
cgtagtcggg tgttgcgtaa tggtggtgtt ttcgaacagg caggcgtcaa cttttcgcat  1680
gtccacgcta aggcgatgcc tgcttccgcc accgctcatc gcccggaact tgccgggcgc  1740
agtttcgagg cgatgggcgt ttcactggta gtgcatccgc ataacccgta tgttcccacc  1800
agccacgcga atgtgcggtt ttttattgcc gaaaaaccgg tgccgatcc cgtctggtgg   1860
tttggcggcg gcttcgattt aaccccttc tatggttttg aagaagacgc cattcactgg  1920
caccgcaccg cccgtgaact gtgccgcca tttggtgaag acgtttatcc ccgttacaaa  1980
aagtggtgcg acgattactt ctacctcaaa catcgcaacg aacagcgcgg tattggcggg  2040
ctgttctttg atgatctgaa cacgccagat ttcgaccact gttttgcctt tatgcaggcg  2100
gtaggcaaag gctacaccga cgcttattta ccaattgtag agcgacgtaa agcgatggcc  2160
tacggcgagc gcgagcgcaa ttttcagctc taccgtccgg tcgttatgt cgagttcaat   2220
ctggtctggg atcgcggcac gctgtttggc ctgcaaactg gcgggcgcac cgagtctatc  2280
ctgatgtcaa tgccgccact ggtacgctgg aatatgatt atcagccaaa agatggcagc   2340
ccagaagcgg cgttaagtga gtttattaag gtcagggatt gggtgtaact gcagataaaa  2400
ggaggaaaat atgtgaaaac attaattctt ttctcaacaa gggacggaca aacgcgcgcg  2460
attgcctcct acctggcttc ggaactgaaa gaactgggga tccaggcgga tgtcgccaat  2520
gtgcaccgca ttgaagaacc acagtgggaa aactatgacc gtgtggtcat tggtgcttct  2580
attcgctatg gtcactacca ttcagcgttc caggaatttg tcaaaaaaca tgcgacgcgg  2640
ctgaattcga tgccgagcgc cttttactcc gtgaatctga accggagaag              2700
cgtactccac agaccaacag ctacgcgcgc aagtttctga tgaactcgca atggcgtccc  2760
gatcgctgcg cggtcattgc cggggcgctg cgttacccac gttatcgctg gtacgaccgt  2820
tttatgatca agctgattat gaagatgtca ggcggtgaaa cggatacgcg caaagaagtt  2880
gtctataccg attgggagca ggtggcgaat tcgcccgag aaatcgccca tttaaccgac   2940
aaaccgacgc tgaaataagc ggccgcataa tgcttaagtc gaacagaaag taatcgtatt  3000
gtacacggcc gcataatcga aattaatacg actcactata ggggaattgt gagcggataa  3060
caattcccca tcttagtata ttagttaagt ataagaagga gatatacata tgcgtcagac  3120
taaaaccggt atcctgctgg caaacctggg tacgcccgat gccccacac ctgaagcggt   3180
aaaacgctat ctgaaacaat ttttaagcga cagacgcgtg gttgatacct cacggttgtt  3240
atggtggcca ttgctgcgcg gcgtgatttt gccgctcgcg tcgccgcgtg tggcgaagct  3300
gtatgcctct gtctggatgg aaggtggctc ggcgctgatg gtttacagcc gtcagcaaca  3360
gcaggcgctg gcacaacgtt taccggagac gcccgtagcg ctgggaatga gctacggctc  3420
gccatcactg gaaagcgccg tagatgaact cctggcagag catgtagatc atattgtggt  3480
gctgccgctt tatccgcaat actcctgttc aacggtcggt gcggtatggg atgaactggc  3540
acgcattctg gcgcgcaaac gtagcattcc ggggatatcg tttattcgtg attacgctga  3600
taaccacgat tacattaatg cactggcgaa cagcgtacgc gcttcttttg ccaaacatgg  3660
cgaaccggat ctgctgctgc tctcttatca tggcattccc cagcgttatg cagatgaagg  3720
cgatgattac ccgcaacgtt gccgcacaac gactcgcgaa ctggcttccg cactgggat    3780
ggcaccggaa aaagtgatga tgacctttca gtcgcgcttt ggtcgggaac cctggctgat  3840
gccttatacc gacgaaacgc tgaaaatgct cggagaaaaa ggcgtaggtc atatacaggt  3900
gatgtgcccg ggctttgctg cggattgtct ggagacgctg gaagagattg ccgagcaaca  3960
ccgtgaggtc ttcctcggtg ccggcggaa aaaatgaa tatattccag cgcttaatgc     4020
cacgccggaa catattgaaa tgatggctaa tcttgttgcc gcgtatcgct aactcgagtc  4080
tggtaaagaa accgctgctg cgaaatttga acgccagcac atggactcgt ctactagcgc  4140
agcttaatta acctaggctg ctgccaccgc tgagcaataa ctagcataac cccttgggc    4200
ctctaaacgg gtcttgaggg gtttttg                                       4228

SEQ ID NO: 7          moltype = DNA   length = 972
FEATURE               Location/Qualifiers
source                1..972
                      mol_type = other DNA
                      organism = synthetic construct
SEQUENCE: 7
acagacttaa tccaacgccc tcgtcgcctg cgcaaatctc ctgcgctgcg cgctatgttt    60
gaagagacaa cacttagcct taacgacctg gtgttgccga tctttgttga agaagaaatt   120
gacgcactac aaagccgttga agccatgcca ggtgtcgatgc gcattccaga gaaacatctg  180
gcacgcgaaa ttgaacgcat cgccaacgcc ggtattcgtt ccgtgatgac tttcggcatc   240
tctcaccata ccgatgaaac cggcagcgat gcctgggcggg aagatggact ggtggcgcga   300
atgtcgcgca tctgcaagca gaccgtgcca gaaatgatcg tcatgtcaga cacctgcttc   360
tgcgaataca catctcacgg tcactgcggt gtgctgtgcg agcatggcgt cgacaacgac   420
gcgactctgg aaaatttagg caagcaagcc gtggttcag ctgctgcagg cgcagacttc    480
atcgcccctt ctgccgcgat ggacggccag gtacaggcga ttcgccagge gctggacgct  540
gcgggctttt aagatacggc gattatgtcg tattccacca agttcgcctc ttccttttat   600
ggtccgttcc gtgaagctgc cggaagcgca ttaaaggcg accgcaaaag ctatcagatg    660
aacccaatga accgtcgtga ggcgattcgt gagtcactgc tggatgaagc ccagggcgca   720
gactgtctga tggttaaacc tgccgagcg tacctcgaca tcgtgcgtga gctgcgtgaa    780
cgtactgaat tgccgattgg cgcgtatcag gtgagcggtg agtacgcgat gattaagttc   840
```

```
gccgcgctgg cgggtgctat agatgaagag aaagtcgtgc tcgaaagctt aggttcaatt    900
aagcgtgcgg gtgcggatct gattttcagc tactttgcga tggatttggc tgagaagaag    960
attctgcgtt aa                                                         972

SEQ ID NO: 8           moltype = DNA   length = 939
FEATURE                Location/Qualifiers
source                 1..939
                       mol_type = other DNA
                       organism = synthetic construct
SEQUENCE: 8
ttagacaatg ttttaagaat tgccacacgc caaagcccac ttgcactctg caggcacac     60
tatgtcaaag acaagttgat ggcgagccat ccgggcctgg tcgttgaact ggtaccgatg    120
gtgacgcgcg gcgatgtgat tcttgatacg ccgctggcga aagtaggcgg aaaaggctta    180
tttgttaaag agctggaagt cgcgctcctc gaaaatcgcc ccgatatcgc cgtacattca    240
atgaaagatg tgccggttga attcccgcaa ggtctgggac tggtcactat ttgtgagcgt    300
gaagatcctc gcgatgcctt tgtgtccaat aactatgaca atctggatgc gttaccggca    360
ggcagtatcg tcgggacgtc cagtttacgt cgccagtgcc aactggctga acgccgcccg    420
gatctgatta tccgctccct gcgaggcaac gtcggcactc gcctgagtaa actggataac    480
ggcgaatacg atgccatcat tcttgccgta gccggactaa aacgtttagg tctggagtcc    540
cgcattgccg ccgcattgcc acccgagatt tctcttccgg cggtaggaca aggtgcggtg    600
ggtattgaat gccgccttga tgattctcgc actcgcgagc tgcttgccgc gctgaatcac    660
cacgaaactg cactgcgcgt taccgcagaa cgcgccataa atacccgtct cgaaggcgga    720
tgtcaggtgc caattggtag ctacgccgag cttattgatg cgaaatctg gctgcgtgcg    780
ttggtcggcg cgccggacgg ttcgcagatt attgcggtg aacgccgcgg tgcgccgcaa    840
gatgccgaac aaatggggat ttcgctggca gaagagctac tgaataacgg cgcgcgcgag    900
atcctcgctg aagtctataa cggagacgct ccggcatga                          939

SEQ ID NO: 9           moltype = DNA   length = 741
FEATURE                Location/Qualifiers
source                 1..741
                       mol_type = other DNA
                       organism = synthetic construct
SEQUENCE: 9
atgagtatcc tggtcacccg cccgtctccc gctggagaag agttagtgag ccgtctgcgc    60
acactggggc aggtggcctg gcatttttcca ctgattgagt tttctccggg tcgacaatta    120
ccacaacttg ctgatcaact ggcggcgctg ggggagagcg atctgttgtt tgccctctcg    180
caacacgcgg ttgcttttgc ccaatcacag ctgcatcagc aagatcgtaa atggccccga    240
ctacctgatt atttcgccat tggacgcacc accgcactgg cactatacac cgtaagcgga    300
cagaagattc tctacccgca ggatcgggaa atcagcgaag tcttgctaca attacctgaa    360
ttacaaaata ttgcgggcaa acgtgcgctg atattacgtg gcaatggcgg tcgtgagcta    420
attggggata ccctgacggc gcggtgct gaggtcactt tttgtaatg ttatcaacga    480
tgcgcaatcc attacgatgg tgcagaagaa gcgatgcgct ggcaatcccg cgaggtgacg    540
acggtcgttg ttaccagcgg tgaaatgttg cagcaactct ggtcgctgat cccacaatgg    600
tatcgtgagc actggttact acactgtcga ctattggtcg tcagtgagcg tttggcgaaa    660
ctcgcccggg aactgggctg gcaagacatt aaggtcgccg ataacgctga caacgatgcg    720
cttttacggg cattacaata a                                              741

SEQ ID NO: 10          moltype = DNA   length = 1062
FEATURE                Location/Qualifiers
source                 1..1062
                       mol_type = other DNA
                       organism = synthetic construct
SEQUENCE: 10
accgaactta aaaacgatcg ttatctgcgg gcgctgctgc gccagcccgt tgatgtcact    60
ccagtatgga tgatgcgcca ggcgggtcgc tatctaccgg aatataaagc cacgcgcgcc    120
caggcgccg atttatgtc gctgtgcaaa aacgccgaac tggcgtgcga agtgacttg     180
caaccgctgc gtcgctaccc gctggatgcg gcgatcctct tttccgatat cctcaccgtg    240
ccggacgcga tggggttagg gctctatttt gaagccggag aaggtccgcg ttttacctcg    300
ccagtcacct gcaaagccga cgtcgataaa ctgccaattc cggacccgga agatgagctg    360
ggttacgtga tgaacgcggt gcgtaccatt cgtcgcgaac tgaaaggcga agtgccgctg    420
attggttttt ccggcagccc gtggacgctg gcgacctaca tggtggaagg cggcagcagc    480
aaagcgttca ccgtgatcaa aaaaatgatg tatgccgatc tgcaggcgct gcacgctcta    540
ctcgataaac tggcgaaaag cgtcactttg tatctgaatg cgcagattaa agccggtgct    600
caggcagtga tgattttcga cacctggggc ggtgtgctta ccgggcgcga ttatcaacag    660
ttctcgctct attacatgca taaaattgtt gatggtttac tgcgtgaaaa cgacggtcgc    720
cgcgtaccgg tcacgctgtt taccaaaggc ggcggacagt ggctggaagc gatgcagaaa    780
accggttgcg atgcgttgga cctcgactgg acaacggata tcgccgatgc gcgccgcctg    840
gtggcaata aagtcgcgtt gcagggtaat atggatccgt cgatgctgta cgctccgcct    900
gcccgcattg aagaagaagt agcgactata cttgcaggtt tcggtcacgg cgaaggtcat    960
gtctttaacc ttggtcacgg cattcatcag gatgtgccgc cagaacatgc tggcgtattc    1020
gtggaggcag tgcatcgact gtctgaacaa tatcaccgct aa                      1062

SEQ ID NO: 11          moltype = DNA   length = 900
FEATURE                Location/Qualifiers
source                 1..900
                       mol_type = other DNA
                       organism = synthetic construct
```

```
SEQUENCE: 11
atgaaacccg acgcacacca ggttaaacag tttctgctca accttcagga tacgatttgt    60
cagcagctga ccgccgtcga tggcgcagaa tttgtcgaag atagttggca gcgcgaagct   120
ggcggcggcg ggcgtagtcg ggtgttgcgt aatggtggtg ttttcgaaca ggcaggcgtc   180
aacttttcgc atgtccacgg tgaggcgatg cctgcttccg ccaccgctca tcgcccggaa   240
cttgccgggc gcagtttcga ggcgatgggc gtttcactgg tagtgcatcc gcataacccg   300
tatgttccca ccagccacgc gaatgtgcgg ttttttattg ccgaaaaacc gggtgccgat   360
cccgtctggt ggtttggcgg cggcttcgat ttaaccccctt tctatggttt tgaagaagac   420
gccattcact ggcaccgcac cgcccgtgac ctgtgcctgc cattggtga agacgttat    480
ccccgttaca aaaagtggtg cgacgattac ttctacctca aacatcgcaa cgaacagcgc   540
ggtattggcg ggctgttctt tgatgatctg aacacgccag atttcgacca ctgttttgcc   600
tttatgcagg cggtaggcaa aggctacacc gacgcttatt accaattgt agagcgacgt   660
aaagcgatgg cctacggcga gcgcgagcgc aatttttcagc tctaccgtcg cggtcgttat   720
gtcgagttca atctggtctg ggatcgcggc acgctgtttg gcctgcaaac tggcgggcgc   780
accgagtcta tcctgatgtc aatgccgcca ctggtacgcc gggaatatga ttatcagcca   840
aaagatggca gcccagaagc ggcgttaagt gagtttatta aggtcaggga ttgggtgtaa   900

SEQ ID NO: 12           moltype = DNA   length = 546
FEATURE                 Location/Qualifiers
source                  1..546
                        mol_type = other DNA
                        organism = synthetic construct
SEQUENCE: 12
gtgaaaacat taattctttt ctcaacaagg gacggacaaa cgcgcgagat tgcctcctac    60
ctggcttcgg aactgaaaga actggggatc caggcggatg tcgccaatgt gcaccgcatt   120
gaagaaccac agtgggaaaa ctatgaccgt gtggtcattg gtgcttctat tcgctatgtg   180
cactaccatt cagcgttcca ggaatttgtc aaaaaacatg cgacgcggct gaattcgatg   240
ccgagcgcct tttactccgt gaatctggtg gcgcgcaaac cggagaagcg tactccacag   300
accaacagct acgcgcgcaa gtttctgatg aactcgcaat ggcgtccgga tcgctgcgcg   360
gtcattgccg gggcgctgcg ttacccacgt tatcgctggt acgaccgttt tatgatcaag   420
ctgattatga agatgtcagg cggtgaaacg gatacgcgca aagaagttgt ctataccgcg   480
tgggagcagg tggcgaattt cgcccgagaa atcgcccatt taaccgacaa accgacgctg   540
aaataa                                                               546

SEQ ID NO: 13           moltype = DNA   length = 960
FEATURE                 Location/Qualifiers
source                  1..960
                        mol_type = other DNA
                        organism = synthetic construct
SEQUENCE: 13
cgtcagacta aaaccggtat cctgctggca aacctgggta cgcccgatgc ccccacacct    60
gaagcggtaa acgctatctt gaaacaattt ttaagcgaca gacgcgtggt tgatacctca   120
cggttgttat ggtggccatt gctgcgcggc gtgattttgc tgtctgcgctc gccgcgtgtg   180
gcgaagctgt atgcctctgt ctggatgaa ggtggctcgc gctgatggt ttacagccgt    240
cagcaacagc aggcgctggc acaacgttta ccggagacgc ccgtagcgct gggaatgagc   300
tacggctcgc catcactgga aagcgccgta gatgaactcc tggcagagca tgtagatcat   360
attgtggtgc tgccgttta tccgcaatac tcctgttcaa cggtcggtcg ggtatgggat   420
gaactggcac gcattctggc gcgcaaacgt agcattccgg ggatatcgtt tattcgtgat   480
tacgctgata accacgatta cattaatgca ctggcgaaca gcgtacgcgc ttctttttgcc   540
aaacatggcg aaccggatct gctgctgctc tcttatcatg gcattcccca gcgttatgca   600
gatgaaggcg atgattaccc gcaacgttgc cgcacaacga ctcgcgaact ggcttccgca   660
ctggggatgg caccggaaaa agtgatgatg accttcagt cgcgcctttgg tcgggaaccc   720
tggctgatgc cttataccga cgaaacgctg aaaatgctcg gagaaaaagg cgtaggtcat   780
atacaggtga tgtgcccggg ctttgctgcg gattgtctgg agacgctgga agagattgcc   840
gagcaaaacc gtgaggtctt cctcggtgcc ggcgggaaaa aatatgaata tattccagcg   900
cttaatgcca cgccggaaca tattgaaatg atggctaatc ttgttgccgc gtatcgctaa   960

SEQ ID NO: 14           moltype = DNA   length = 35
FEATURE                 Location/Qualifiers
source                  1..35
                        mol_type = other DNA
                        organism = synthetic construct
SEQUENCE: 14
taaggagata taatgagcgt taacctggcg agcca                                35

SEQ ID NO: 15           moltype = DNA   length = 50
FEATURE                 Location/Qualifiers
source                  1..50
                        mol_type = other DNA
                        organism = synthetic construct
SEQUENCE: 15
ttggtctggc gacctctgaa ggctaacgaa cagaaagtaa tcgtattgta              50

SEQ ID NO: 16           moltype = DNA   length = 23
FEATURE                 Location/Qualifiers
source                  1..23
                        mol_type = other DNA
                        organism = synthetic construct
```

```
SEQUENCE: 16
cgaacagaaa gtaatcgtat tgt                                           23

SEQ ID NO: 17          moltype = DNA   length = 44
FEATURE                Location/Qualifiers
source                 1..44
                       mol_type = other DNA
                       organism = synthetic construct
SEQUENCE: 17
aggttaacgc tcattatatc tccttattaa agttaaacaa aatt                    44

SEQ ID NO: 18          moltype = DNA   length = 30
FEATURE                Location/Qualifiers
source                 1..30
                       mol_type = other DNA
                       organism = synthetic construct
SEQUENCE: 18
atataatggc ggttaccgat ctgtctctga                                    30

SEQ ID NO: 19          moltype = DNA   length = 49
FEATURE                Location/Qualifiers
source                 1..49
                       mol_type = other DNA
                       organism = synthetic construct
SEQUENCE: 19
gttctgttcg atgttatcca gtaagcagat ctcaattgga tatcggccg               49

SEQ ID NO: 20          moltype = DNA   length = 47
FEATURE                Location/Qualifiers
source                 1..47
                       mol_type = other DNA
                       organism = synthetic construct
SEQUENCE: 20
attagttaag tataagaagg agatataatg gcggttaccg atctgtc                 47

SEQ ID NO: 21          moltype = DNA   length = 25
FEATURE                Location/Qualifiers
source                 1..25
                       mol_type = other DNA
                       organism = synthetic construct
SEQUENCE: 21
gcagatctca attggatatc ggccg                                         25

SEQ ID NO: 22          moltype = DNA   length = 56
FEATURE                Location/Qualifiers
source                 1..56
                       mol_type = other DNA
                       organism = synthetic construct
SEQUENCE: 22
gaatttcag atgtgtttta tccgggaggc attgatctcg acgctctccc ttatgc        56

SEQ ID NO: 23          moltype = DNA   length = 52
FEATURE                Location/Qualifiers
source                 1..52
                       mol_type = other DNA
                       organism = synthetic construct
SEQUENCE: 23
ctaaacgggt cttgaggggt tttttgtgag atactgatat gagcaacatt ac           52

SEQ ID NO: 24          moltype = DNA   length = 30
FEATURE                Location/Qualifiers
source                 1..30
                       mol_type = other DNA
                       organism = synthetic construct
SEQUENCE: 24
ctattacctt cctctgcact tacacattcg                                    30

SEQ ID NO: 25          moltype = DNA   length = 24
FEATURE                Location/Qualifiers
source                 1..24
                       mol_type = other DNA
                       organism = synthetic construct
SEQUENCE: 25
gatgtgtttt atccgggagg catt                                          24

SEQ ID NO: 26          moltype = DNA   length = 39
FEATURE                Location/Qualifiers
```

```
                        source          1..39
                                        mol_type = other DNA
                                        organism = synthetic construct
SEQUENCE: 26
tgagatactg atatgagcaa cattaccatt tatcacaac                          39

SEQ ID NO: 27           moltype = DNA   length = 36
FEATURE                 Location/Qualifiers
source                  1..36
                        mol_type = other DNA
                        organism = synthetic construct
SEQUENCE: 27
gttatttgta ggcctgacag gcgtagcgca tcaggc                             36

SEQ ID NO: 28           moltype = DNA   length = 54
FEATURE                 Location/Qualifiers
source                  1..54
                        mol_type = other DNA
                        organism = synthetic construct
SEQUENCE: 28
gttagataag aactctctca ctccctatta ccttcctctg cacttacaca ttcg         54

SEQ ID NO: 29           moltype = DNA   length = 52
FEATURE                 Location/Qualifiers
source                  1..52
                        mol_type = other DNA
                        organism = synthetic construct
SEQUENCE: 29
ctaaacgggt cttgaggggt tttttgtgag atactgatat gagcaacatt ac           52

SEQ ID NO: 30           moltype = DNA   length = 59
FEATURE                 Location/Qualifiers
source                  1..59
                        mol_type = other DNA
                        organism = synthetic construct
SEQUENCE: 30
gggtcttgag gggttttttg tgagatactg atatgagcaa cattaccatt tatcacaac    59

SEQ ID NO: 31           moltype = DNA   length = 36
FEATURE                 Location/Qualifiers
source                  1..36
                        mol_type = other DNA
                        organism = synthetic construct
SEQUENCE: 31
gttatttgta ggcctgacag gcgtagcgca tcaggc                             36

SEQ ID NO: 32           moltype = DNA   length = 53
FEATURE                 Location/Qualifiers
source                  1..53
                        mol_type = other DNA
                        organism = synthetic construct
SEQUENCE: 32
aatacgggta aagtcctgcg gttttagagc tagaaatagc aagttaaaat aag          53

SEQ ID NO: 33           moltype = DNA   length = 57
FEATURE                 Location/Qualifiers
source                  1..57
                        mol_type = other DNA
                        organism = synthetic construct
SEQUENCE: 33
ctctaaaacc gcaggacttt acccgtatta ctagtattat acctaggact gagctag      57

SEQ ID NO: 34           moltype = DNA   length = 31
FEATURE                 Location/Qualifiers
source                  1..31
                        mol_type = other DNA
                        organism = synthetic construct
SEQUENCE: 34
caatgttagc cactggctaa tagtattgag c                                  31

SEQ ID NO: 35           moltype = DNA   length = 24
FEATURE                 Location/Qualifiers
source                  1..24
                        mol_type = other DNA
                        organism = synthetic construct
SEQUENCE: 35
ggacgcgata attggaatct cacg                                          24

SEQ ID NO: 36           moltype = DNA   length = 27
```

```
FEATURE              Location/Qualifiers
source               1..27
                     mol_type = other DNA
                     organism = synthetic construct
SEQUENCE: 36
gatctcgacg ctctccctta tgcgact                                        27

SEQ ID NO: 37        moltype = DNA   length = 27
FEATURE              Location/Qualifiers
source               1..27
                     mol_type = other DNA
                     organism = synthetic construct
SEQUENCE: 37
tctaaacggg tcttgagggg tttttg                                         27

SEQ ID NO: 38        moltype = DNA   length = 27
FEATURE              Location/Qualifiers
source               1..27
                     mol_type = other DNA
                     organism = synthetic construct
SEQUENCE: 38
tctaaacggg tcttgagggg tttttg                                         27

SEQ ID NO: 39        moltype = DNA   length = 22
FEATURE              Location/Qualifiers
source               1..22
                     mol_type = other DNA
                     organism = synthetic construct
SEQUENCE: 39
cactttggtg gacgacccaa ac                                             22

SEQ ID NO: 40        moltype = DNA   length = 23
FEATURE              Location/Qualifiers
source               1..23
                     mol_type = other DNA
                     organism = synthetic construct
SEQUENCE: 40
gtgtattacg cagtcaggta cgc                                            23

SEQ ID NO: 41        moltype = DNA   length = 28
FEATURE              Location/Qualifiers
source               1..28
                     mol_type = other DNA
                     organism = synthetic construct
SEQUENCE: 41
tggcctttaa tcaatgaatc agaaacgc                                       28

SEQ ID NO: 42        moltype = DNA   length = 55
FEATURE              Location/Qualifiers
source               1..55
                     mol_type = other DNA
                     organism = synthetic construct
SEQUENCE: 42
tggcctttaa tcaatgaatc agaaacgctc taaacgggtc ttgaggggtt tttg          55

SEQ ID NO: 43        moltype = DNA   length = 58
FEATURE              Location/Qualifiers
source               1..58
                     mol_type = other DNA
                     organism = synthetic construct
SEQUENCE: 43
caatttaaac atcttagcat aaagttttag agctagcact tggtggacg acccaaac       58

SEQ ID NO: 44        moltype = DNA   length = 58
FEATURE              Location/Qualifiers
source               1..58
                     mol_type = other DNA
                     organism = synthetic construct
SEQUENCE: 44
ataatactag tgttagataa gaactctctc actccgtgta ttacgcagtc aggtacgc      58

SEQ ID NO: 45        moltype = DNA   length = 58
FEATURE              Location/Qualifiers
source               1..58
                     mol_type = other DNA
                     organism = synthetic construct
SEQUENCE: 45
cactttggtg gacgacccaa accaatttaa acatcttagc ataaagtttt agagctag      58
```

-continued

```
SEQ ID NO: 46            moltype = DNA   length = 53
FEATURE                  Location/Qualifiers
source                   1..53
                         mol_type = other DNA
                         organism = synthetic construct
SEQUENCE: 46
tgacggtaca gaaacccgg gttttagagc tagaaatagc aagttaaaat aag         53

SEQ ID NO: 47            moltype = DNA   length = 57
FEATURE                  Location/Qualifiers
source                   1..57
                         mol_type = other DNA
                         organism = synthetic construct
SEQUENCE: 47
ctctaaaacc cgggttttct gtaccgtcaa ctagtattat acctaggact gagctag    57

SEQ ID NO: 48            moltype = DNA   length = 24
FEATURE                  Location/Qualifiers
source                   1..24
                         mol_type = other DNA
                         organism = synthetic construct
SEQUENCE: 48
gttggcgcag gtggttttac tttg                                        24

SEQ ID NO: 49            moltype = DNA   length = 20
FEATURE                  Location/Qualifiers
source                   1..20
                         mol_type = other DNA
                         organism = synthetic construct
SEQUENCE: 49
caatggcgca attatcgccg                                             20

SEQ ID NO: 50            moltype = DNA   length = 50
FEATURE                  Location/Qualifiers
source                   1..50
                         mol_type = other DNA
                         organism = synthetic construct
SEQUENCE: 50
agtcgacaag cttggtggcg gcggcggatc aggtggtggt ggttcaggtg            50

SEQ ID NO: 51            moltype = DNA   length = 56
FEATURE                  Location/Qualifiers
source                   1..56
                         mol_type = other DNA
                         organism = synthetic construct
SEQUENCE: 51
gaacgtctgg aaaaagaaga agccaaacga acagaaagta atcgtattgt acacgg     56

SEQ ID NO: 52            moltype = DNA   length = 40
FEATURE                  Location/Qualifiers
source                   1..40
                         mol_type = other DNA
                         organism = synthetic construct
SEQUENCE: 52
tggcgacctc tgaaggctaa gtcgacaagc ttggtggcgg                       40

SEQ ID NO: 53            moltype = DNA   length = 49
FEATURE                  Location/Qualifiers
source                   1..49
                         mol_type = other DNA
                         organism = synthetic construct
SEQUENCE: 53
tggaaaaga agaagccaaa cgaacagaaa gtaatcgtat tgtacacgg              49

SEQ ID NO: 54            moltype = DNA   length = 39
FEATURE                  Location/Qualifiers
source                   1..39
                         mol_type = other DNA
                         organism = synthetic construct
SEQUENCE: 54
ttggtggcgg cggcggatca atggcggtta ccgatctgt                        39

SEQ ID NO: 55            moltype = DNA   length = 64
FEATURE                  Location/Qualifiers
source                   1..64
                         mol_type = other DNA
                         organism = synthetic construct
```

```
SEQUENCE: 55
attcccatc ttagtatatt agttaagtat aagaaggaga tataggtggt ggtggttcag    60
gtgg                                                                64

SEQ ID NO: 56           moltype = DNA  length = 39
FEATURE                 Location/Qualifiers
source                  1..39
                        mol_type = other DNA
                        organism = synthetic construct
SEQUENCE: 56
aagtataaga aggagatata ggtggtggtg gttcaggtg                          39

SEQ ID NO: 57           moltype = DNA  length = 58
FEATURE                 Location/Qualifiers
source                  1..58
                        mol_type = other DNA
                        organism = synthetic construct
SEQUENCE: 57
gattatcaaa gaagcaaccg aaggttgcgt cgacaagctt ggtggcggcg gcggatca     58

SEQ ID NO: 58           moltype = DNA  length = 6425
FEATURE                 Location/Qualifiers
source                  1..6425
                        mol_type = other DNA
                        organism = synthetic construct
SEQUENCE: 58
ggggaattgt gagcggataa caattcccct gtagaaataa ttttgtttaa ctttaataag    60
gagatatacc atgggtacag acttaatcca acgccctcgt cgcctgcgca aatctcctgc   120
gctgcgcgct atgtttgaag agacaacact tagccttaac gacctggtgt tgccgatctt   180
tgttgaagaa gaaattgacg actacaaagc cgttgaagcc atgccaggtg tgatgcgcat   240
tccagagaaa catctggcac gcgaaattga acgcatcgcc aacgccggta ttcgttccgt   300
gatgactttc ggcatctctc accataccga tgaaaccggc agcgatgcct ggcgggaaga   360
tggactggtg gcgcgaatgt cgcgcatctg caagcagacc gtgccagaaa tgatcgtcat   420
gtcagacacc tgcttctgcg aatacacatc tcacggtcaa tgcggtgtgc tgtgcgagca   480
tggcgtcgac aacgacgcga ctctggaaaa tttaggcaag caagccgtgg ttgcagctgc   540
tgcaggcgca gacttcatcg ccccttctgc cgcgatggac ggccaggtac aggcgattcg   600
ccaggcgctg gacgctgcgg gctttaagga tacggcgatt atgtcgtatt cgaccaagtt   660
cgcctcttcc ttttatggtc cgttccgtga agctgccgga agcgcattaa aaggcgaccg   720
caaaagctat cagatgaacc caatgaaccg tcgtgaggcg attcgtgagt cactgctgga   780
tgaagcccag ggcgcagact gtctgatggt taaacctgcc ggagcgtacc tcgacatcgt   840
gcgtgagctg cgtgaacgta ctgaattgcc gattggcgcg tatcaggtga gcggtgagta   900
cgcgatgatt aagttcgccg cgctggcggg tgctatagat gaagagaaag tcgtgctcga   960
aagcttaggt tcaattaagc gtgcgggtgc ggatctgatt ttcagctact ttgcgatgga  1020
tttggctgag aagaagattc tgcgttaagg atccgaattc gagctcggcg cgcctgcagg  1080
tcgacaagct tgcggccgca taatgcttaa gtcgaacaga aagtaatcgt attgtacacg  1140
gccgcataat cgaaattaat acgactcact ataggggaat tgtgagcgga taacaattcc  1200
ccatcttagt atattagtta agtataagaa ggagatatac atatgttaga caatgttttta  1260
agaattgcca cacgcaaag cccacttgca ctctggcagg cacactatgt caaagacaag  1320
ttgatggcga gccatccggg cctggtcgtt gaactggtac cgatggtgac gcgcggcgat  1380
gtgattcttg tatacgccgct ggcgaaagta ggcgaaaaag gcttatttgt taaagagctg  1440
gaagtcgcgc tcctcgaaaa tcgcgccgat atcgccgtac attcaatgaa agatgtgccg  1500
gttgaattcc cgcaaggtct gggactggtc actatttgtg agcgtgaaga tcctcgcgat  1560
gcctttgtgt ccaataacta tgacaatctg gatgcgttac cggcaggcag tatcgtcggg  1620
acgtccagtt tacgtcgcca gtgccaactg gctgaacgcc gcccgatct gattatccgc  1680
tccctgcgag gcaacgtcgg cactcgcctg agtaaactgg ataacggcga atacgatgcc  1740
atcattcttg cggtagccgg actaaaacgt ttaggtctgg agtccgcat cgcgccgca  1800
ttgccacccg agatttctct tccggcggta ggacaaggtg cggtgggtat tgaatgccgc  1860
cttgatgatt ctcgcactcg cgagctgctt gccgcgctga tcaccacga aactgcactg  1920
cgcgttaccg cagaacgcgc catgaatacc cgtctcgaag gcgatgtca ggtgccaatt  1980
ggtagctacg ccgagcttat tgatggcgaa atctggctgc gtgcgttggt cggcgcgccg  2040
gacggttcgc agattattcg cggtgaacgc gcggtgcgc cgcaagatgc gaacaaatg  2100
gggatttcgc tggcagaaga gctactgaat aacggcgcgc gcgagatcct cgctgaagtc  2160
tataacggag acgctccggc atgaagatct ataaaggag gaaatatat gagtatcctg  2220
gtcaccgac cgtctcccgc tggagaagag ttagtgagc gtctgcgcac actgaggca  2280
gtggcctggc atttccact gattgagttt tctccgggtc gacaattacc acaacttgct  2340
gatcaactgg cggcgctggg ggagagcgat ctgttgtttg ccctctcgca acacgcgtt  2400
gcttttgccc aatcacagct gcatcagcaa gatcgtaaat ggcccgact acctgattat  2460
ttcgccattg gacgcaccac cgcactggca ctacatcacg taagcggaca gaagattctc  2520
tacccgcagg atcgggaaat cagcgaagtc ttgctacaat tacctgaatt acaaaatatt  2580
gcgggcaaac gtcgcgctga ttacgtggcc aatggcggtc gtgagctaat ggggataccc  2640
ctgacgcgcg cgcggtgctga ggtcactttt tgtgaatgtt atcaacgatg cgcaatccat  2700
tacgatggtc cagaagaagc gatgcgctgg caatcccgcg aggtgacgac ggtcgttgtt  2760
accagcggtg aaatgttgca gcaactctgg tcgctgatcc acaatggta tcgtgagcac  2820
tggttactac actgtcgact attggtcgtc agtgagcgtt tggcgaaact cgcccgggaa  2880
ctgggctggc aagacattaa ggtcgccgat aacgctgaca acgatgcgct tttacgggca  2940
ttacaataac tcgagtctgg taaagaaacc gctgctgcga aatttgaacg ccagcacatg  3000
gactcgtcta ctagcgcagc ttaattaacc taggctgctg ccaccgctga gcaataacta  3060
gcataacccc ttggggcctc taaacgggtc ttgaggggtt ttttgctgaa acctcaggca  3120
tttgagaagc acacggtcac actgcttccg gtagtcaata aaccggtaaa ccagcaatag  3180
```

```
acataagcgg ctatttaacg accctgccct gaaccgacga caagctgacg accgggtctc    3240
cgcaagtggc acttttcggg gaaatgtgcg cggaacccct atttgtttat ttttctaaat    3300
acattcaaat atgtatccgc tcatgaatta attcttagaa aaactcatcg agcatcaaat    3360
gaaactgcaa tttattcata tcaggattat caataccata ttttgaaaa agccgttct     3420
gtaatgaagg agaaaactca ccgaggcagt tccataggat ggcaagatcc tggtatcggt    3480
ctgcgattcc gactcgtcca acatcaatac aacctattaa tttccctcg tcaaaaataa    3540
ggttatcaag tgagaaatca ccatgagtga cgactgaatc cggtgagaat ggcaaaagtt    3600
tatgcatttc tttccagact tgttcaacag gccagccatt acgctcgtca tcaaaatcac    3660
tcgcatcaac caaaccgtta ttcattcgtg attgcgcctg agcgagacga aatacgcggt    3720
cgctgttaaa aggacaatta caaacaggaa tcgaatgcaa ccggcgcagg aacactgcca    3780
gcgcatcaac aatattttca cctgaatcag gatattcttc taatacctgg aatgctgttt    3840
tcccggggat cgcagtggtg agtaaccatg catcatcagg agtacggata aaatgcttga    3900
tggtcggaag aggcataaat tccgtcagcc agtttagtct gaccatctca tctgtaacat    3960
cattggcaac gctacctttg ccatgtttca gaaacaactc tggcgcatcg ggcttcccat    4020
acaatcgata gattgtcgca cctgattgcc cgacattatc gcgagcccat ttatacccat    4080
ataaatcagc atccatgttg gaatttaatc gcggcctaga gcaagacgtt tcccgttgaa    4140
tatggctcat actcttcctt tttcaatatt attgaagcat ttatcagggt tattgtctca    4200
tgagcgatac catatttgaa tgtatttaga aaaataaaca aataggcatg cagcgctctt    4260
ccgcttcctc gctcactgac tcgctacgct cggtcgttcg actgcggcga gcggtgtcag    4320
ctcactcaaa agcggtaata cggttatcca cagaatcagg ggataaagcc ggaaagaaca    4380
tgtgagcaaa aagcaaagca ccggaagaag ccaacgccgc aggcgttttt ccataggctc    4440
cgcccccctg acgagcatca caaaaatcga cgctcaagcc agaggtggcg aaacccgaca    4500
ggactataaa gataccaggc gtttccccct ggaagctccc tcgtgcgctc tcctgttccg    4560
accctgccgc ttaccggata cctgtccgcc tttctccctt cgggaagcgt ggcgctttct    4620
catagctcac gctgttggta tctcagttcg gtgtaggtcg ttcgctccaa gctgggctgt    4680
gtgcacgaac cccccgttca gcccgaccgc tgcgccttat ccggtaacta tcgtcttgag    4740
tccaacccgg taagacacga cttatcgcca ctggcagcag ccattggtaa ctgatttaga    4800
ggactttgtc ttgaagttat gcacctgtta aggctaaact gaaagaacag atttggtga    4860
gtgcggtcct ccaacccact taccttggtt caaagagttg gtagctcagc gaaccttgag    4920
aaaaccaccg ttggtagcgg tggtttttct ttatttagga gatgatgaat caatcggtca    4980
atcaagtcaa cgaacagcta ttccgttact ctagatttca gtgcaattta tctcttcaaa    5040
tgtagcacct gaagtcagcc ccatacgata taagttgtaa ttctcatgtt agtcatgccc    5100
cgcgcccacc ggaaggagct gactggggttg aaggctctca agggcatcgg tcgagatccc    5160
ggtgcctaat gagtgagcta acttacatta attgcgttgc gctcactgcc cgcttttccag   5220
tcgggaaacc tgtcgtgcca gctgcattaa tgaatcggcc aacgcgcggg gagaggcggt    5280
ttgcgtattg ggcgccaggg tggtttttct tttcaccagt gagacgggca acagctgatt    5340
gcccttcacc gcctggccct gagagagttg cagcaagcgg tccacgctgg tttgccccag    5400
caggcgaaaa tcctgtttga tggtggttaa cggcgggata taacatgagc tgtcttcggt    5460
atcgtcgtat cccactaccg agatgtccgc accaacgcgc agcccggact cggtaatgcc    5520
gcgcattgcg cccagcgcca tctgatcgtt ggcaaccagc atcgcagtgg aacgatgcc    5580
ctcattcagc atttgcatgg tttgttgaaa accggacatg gcactccagt cgccttcccg    5640
ttccgctatc ggctgaattt gattgcgagt gagatatta tgccagccag ccagacgcag    5700
acgcgccgag acagaactta atgggcccgc taacagcgcg atttgctggt gacccaatgc    5760
gaccagatgc tccacgccca gtcgcgtacc gtcttcatgg gagaaaataa tactgttgat    5820
gggtgtctgg tcagagacat caagaaataa cgccggaaca ttagtgcagg cagcttccac    5880
agcaatggca tcctggtcat ccagcggata gttaatgatc agcccactga cgcgttgcgc    5940
gagaagattg tgcaccgccg cttttacaggc ttcgacgccg cttcgttcta ccatcgacac    6000
caccacgctg gcacccagtt gatcggcgcg agatttaatc gccgcgacaa tttgcgacgg    6060
cgcgtgcagg gccagactgg aggtggcaac gccaatcagc aacgactgtt tgcccgccag    6120
ttgttgtgcc acgcggttgg gaatgtaatt cagctccgcc atcgccgctt ccactttttc    6180
ccgcgttttc gcagaaacgt ggctggcctg gttcaccacg cgggaaacgg tctgataaga    6240
gacaccggca tactctgcga catcgtataa cgttactggt ttcacattca ccaccctgaa    6300
ttgactctct tccgggcgct atcatgccat accgcgaaag gttttgcgcc attcgatggt    6360
gtccgggatc tcgacgctct cccttatgcg actcctgcat taggaaatta atacgactca    6420
ctata                                                                6425
```

SEQ ID NO: 59          moltype = DNA   length = 8813
FEATURE                Location/Qualifiers
source                 1..8813
                       mol_type = other DNA
                       organism = synthetic construct
SEQUENCE: 59

```
tctgataaga gacaccggca tactctgcga catcgtataa cgttactggt ttcacattca    60
ccaccctgaa ttgactctct tccgggcgct atcatgccat accgcgaaag gttttgcgcc    120
attcgatggt gtccgggatc tcgacgctct cccttatgcg actcctgcat taggaagcag    180
cccagtagta ggttgaggcc gttgagcacc gccgccgcaa ggaatggtgc atgcaaggag    240
atggcgccca acagtccccc ggccacgggg cctgccacca tacccacgcc gaaacaagcg    300
ctcatgagcc cgaagtggcg agcccgatct tccccatcgg tgatgtcggc gatataggcg    360
ccagcaaccg cacctgtggc gccggtgatg ccggccacga cgcgtccggc gtagaggcga    420
gagatcgatc tcgatcccgc gaaattaata cgactcacta gggggaatt gtgagcggat    480
aacaattccc ctctagaaat aattttgttt aactttaaga aggagatata ccatgggtac    540
cgaacttaaa aacgatcgtt atctgcgggg gctgctgcgc cagcccgttg atgtcactcc    600
agtatggatg atgcgccagg cgggtcgcta tctaccggaa tataaagcca cgcgcgccca    660
ggcgggcgat tttatgtcgc tgtgcaaaaa cgctgcgaag tgacttttga    720
accgctgcgt cgctaccgcc tggatgcgg atcctctttt ccgatatcc tcaccgtgcc    780
ggacgcgatg gggttagggc tctatttga agccggagaa ggtccgcgtt ttacctcgcc    840
agtcacctgc aaagccgacg tcgataaact gccaattccg gacccggaag atgagctggg    900
ttacgtgatg aacgcggtgc gtaccattcg tcgcgaactg aaaggcgaag tgccgctgat    960
tggtttttcc ggcagcccgt ggacgctggc gacctacatg gtggaaggcg gcagcagcaa    1020
```

```
agcgttcacc gtgatcaaaa aaatgatgta tgccgatccg caggcgctgc acgctctact   1080
cgataaactg gcgaaaagcg tcactttgta tctgaatgcg cagattaaag ccggtgctca   1140
ggcagtgatg attttcgaca cctggggcgg tgtgcttacc gggcgcgatt atcaacagtt   1200
ctcgctctat tacatgcata aaattgttga tggtttactg cgtgaaaacg acggtcgccg   1260
cgtaccggtc acgctgttta ccaaaggcgg cggacagtgc tggaagcga tggcagaaac   1320
cggttgcgat gcgttgggcc tcgactggac aacggatatc gccgatgcgc gccgccgtgt   1380
gggcaataaa gtcgcgttgc agggtaatat ggatccgtcg atgctgtacg ctccgcctgc   1440
ccgcattgaa gaagaagtag cgactatact tgcaggtttc ggtcacgcg aaggtcatgt   1500
ctttaacctt ggtcacggca ttcatcagga tgtgccgcca aacatgctg gcgtattcgt   1560
ggaggcagtg catcgactgt ctgaacaata tcaccgctaa gagctcataa aaggaggaaa   1620
atatatgaaa cccgacgcac accaggttaa acagtttctg ctcaaccttc aggatacgat   1680
ttgtcagcag ctgaccgccg tcgatggcgc agaatttgtc gaagatagtt ggcagcgcga   1740
agctggcgg ggcgggcgta gtcgggtgtt gcgtaatggg ggtgttttcg aacaggcagg   1800
cgtcaacttt tcgcatgtcc acggtgaggc gatgcctgct tccgccaccg ctcatcgccc   1860
ggaacttgcc gggcgcagtt tcgaggcgat gggcgtttca ctggtagtgc atccgcataa   1920
cccgtatgtt cccaccagcc acgcgaatgt gcggttttt attgccgaaa aaccgggtgc   1980
cgatcccgtc tggtggtttg gcggcggctt cgatttaacc cctttctatg gttttgaaga   2040
agacgccatt cactggcacc gcaccgcccg tgacctgtgc ctgccatttg gtgaagacgt   2100
ttatcccggt tacaaaaagt ggtgcgacga ttacttctac ctcaaacatc gcaacgaaca   2160
gcgcggtatt ggcgggctgt tctttgatga tctgaacacg ccagatttcg accactgttt   2220
tgcctttatg caggcggtag gcaaaggcta caccgacgct tatttaccaa ttgtagagcg   2280
acgtaaagcg atggcctacg gcgagcgcga gcgcaatttt cagctctacc gtcgcggtca   2340
ttatgtcgag ttcaatctgg tctgggatcg cggcacgctg tttggcctgc aaactggcg   2400
gcgcaccgag tctatcctga tgtcaatgcc gccactggta cgctgggaat atgattatca   2460
gccaaaagat ggcagcccag aagcggcgtt aagtgagttt attaaggtca gggattgggt   2520
gtaactgcag ataaaaggag gaaaatatgt gaaaacatta attctttttct caacaaggga   2580
cggacaaacg cgcgagattg cctcctacct ggcttcggaa ctgaaagaac tggggatcca   2640
ggcggatgtc gccaatgtgc accgcattga agaaccacag tgggaaaaact atgaccgtgt   2700
ggtcattggt gcttctattc gctatggtca ctaccattca gcgttccagg aatttgtcaa   2760
aaaacatgcg acgcggctga attcgatgcc gagcgcctt tactccgtga atctggtgc   2820
gcgcaaaccg gagagcgta ctccacagac caacagctac gcgcgcaagt ttctgatgaa   2880
ctcgcaatgg cgtcccgatc gctgcgcggt cattgccggg gcgctgcgtt acccacgtta   2940
tcgctggtac gaccgtttta tgatcaagct gattatgaag atgtcaggcg gtgaaacgga   3000
tacgcgcaaa gaagttgtct ataccgattg ggagcaggtg gcgaattcg cccgagaaat   3060
cgccattta accgacaaac cgacgctgaa ataagcggcc gcataatgct taagtcgaac   3120
agaaagtaat cgtattgtac acggccgcat aatcgaaatt aatacgactc actatagggg   3180
aattgtgagc ggataacaat tcccatcatt agtatattag ttaagtataa gaggagata   3240
tacatatgcg tcagactaaa accggtatcc tgctggcaaa cctgggtacg cccgatgccc   3300
ccacacctga agcggtaaaa cgctatctga aacaatttt aagcgacaga cgcgtggttg   3360
atacctcacg gttgttatgg tggccattgc tgcgcggcgt gattttgccg ctgcgctcgc   3420
cgcgtgtggc gaagctgtat gcctctgtct ggatggaagg tggctcgccg ctgatggttt   3480
acagccgtca gcaacagcag gcgctggcac aacgtttacc ggagacgccc gtagcgctgg   3540
gaatgagcta cggctcgcca tcactggaaa gcgccgtaga tgaactcctg gcagagcatg   3600
tagatcatat tgtggtgctg ccgctttatc cgcaatactc ctgttcaacg gtcggtgcgg   3660
tatgggatga actggcacgc attctggcgc gcaaacgtag cattccgggg atatcgttta   3720
ttcgtgatta cgctgataac cacgattaca ttaatgcact ggcgaacagc gtacgcgctt   3780
cttttgccaa acatggcgaa ccggatctgc tgctgctcta ttatcatggc attccccagc   3840
gttatgcaga tgaaggcgat gattaccgc aacgttgccg cacaacgact cgcgaactgg   3900
cttccgcact ggggatggca ccggaaaaag tgatgatgac ctttcagtcg cgctttggtc   3960
gggaaccctg gctgatgcct tataccgacg aaacgctgaa aatgctcgga gaaaaggcg   4020
taggtcatat acaggtgatg tgcccgggct ttgctgcgaa ttgtctggag acgctggaag   4080
agattgccga gcaaaaccgt gaggtcttcc tcggtgccgg cgggaaaaaa tatgaatata   4140
ttccagcgct taatgccacg ccggaacata ttgaaatgat ggctaatctt gttgccgcgt   4200
atcgctaact cgagtctggt aaagaaaccg ctgctgcgaa atttgaacgc agcacatgg   4260
actcgtctac tagcgcagct taattaacct aggctgctgc caccgctgag caataactag   4320
cataacccct tggggcctct aaacgggtct tgaggggttt tttgctgaaa ggaggaacta   4380
tatccggatt ggcgaatggg acgcgccctg tagcgggcga ttaagcgcgg cgggtgtggt   4440
ggttacgcgc agcgtgaccg ctacacttgc cagcgcccta gcgcccgctc ctttcgcttt   4500
cttcccttcc tttctcgcca cgttcgccgg ctttccccgt caagctctaa atcggggggct   4560
cccctttaggg ttccgattta gtgctttacg gcacctcgac cccaaaaaac ttgattaggg   4620
tgatggttca cgtagtgggc catcgccctg atagacggtt tttcgccctt tgacgttgga   4680
gtccacgttc tttaatagtg gactcttgtt ccaaactgga acaacactca accctatctc   4740
ggtctattct tttgatttat aagggatttt gccgatttcg gcctattggt taaaaatga   4800
gctgatttaa caaaaattta acgcgaattt taacaaaata ttaacgttta caatttggc   4860
cggcacgatg gcatgagatt atcaaaaagg atcttcacct agatccttt aaattaaaaa   4920
tgaagtttta aatcaatcta agtatatat gagtaaactt ggtctgacag ttaccaatgc   4980
ttaatcagtg aggcacctat ctcagcgatc tgtctatttc gttcatccat agttgcctga   5040
ctccccgtcg tgtagataac tacgatacgg gagggcttac catctggccc cagtgctgca   5100
atgataccgc gagacccacg ctcaccggct ccagatttat cagcaataaa ccagccagcc   5160
ggaagggccg agcgcagaag tggtcctgca actttatccg cctccatcca gtctattaat   5220
tgttgccggg aagctagagt aagtagttcg ccagttaata gtttgcgcaa cgttgttgcc   5280
attgctacag gcatcgtggt gtcacgctcg tcgtttggta tggcttcatt cagctccggt   5340
tcccaacgat caaggcgagt tacatgatcc cccatgttgt gcaaaaaagc ggttagctcc   5400
ttcggtcctc cgatcgttgt cagaagtaag ttggccgcag tgttatcact catggttatg   5460
gcagcactgc ataattctct tactgtcatg ccatccgtaa gatgcttttc tgtgactggt   5520
gagtactcaa ccaagtcatt ctgagaatag tgtatgcggc gaccgagttg ctcttgcccg   5580
gcgtcaatac gggataatac cgcgccacat agcagaactt taaaagtgct catcattgga   5640
aaacgttctt cggggcgaaa actctcaagg atcttaccgc tgttgagatc cagttcgatg   5700
taacccactc gtgcacccaa ctgatcttca gcatctttta ctttcaccag cgtttctggg   5760
```

-continued

```
tgagcaaaaa caggaaggca aaatgccgca aaaaagggaa taagggcgac acggaaatgt 5820
tgaatactca tactcttcct ttttcaatca tgattgaagc atttatcagg gttattgtct 5880
catgagcgga tacatatttg aatgtattta gaaaaataaa caaataggtc atgaccaaaa 5940
tcccttaacg tgagttttcg ttccactgag cgtcagaccc cgtagaaaag atcaaaggat 6000
cttcttgaga tccttttttt ctgcgcgtaa tctgctgctt gcaaacaaaa aaaccaccgc 6060
taccagcggt ggtttgtttg ccggatcaag agctaccaac tctttttccg aaggtaactg 6120
gcttcagcag agcgcagata ccaaatactg tccttctagt gtagccgtag ttaggccacc 6180
acttcaagaa ctctgtagca ccgcctacat acctcgctct gctaatcctg ttaccagtgg 6240
ctgctgccag tggcgataag tcgtgtctta ccgggttgga ctcaagacga tagttaccgg 6300
ataaggcgca gcggtcgggc tgaacggggg gttcgtgcac acagcccagc ttggagcgaa 6360
cgacctacac cgaactgaga tacctacagc gtgagctatg agaaagcgcc acgcttcccg 6420
aagggagaaa ggcggacagg tatccggtaa gcggcagggt cggaacagga gagcgcacga 6480
gggagcttcc agggggaaac gcctggtatc tttatagtcc tgtcgggttt cgccacctct 6540
gacttgagcg tcgatttttg tgatgctcgt caggggggcg gagcctatgg aaaaacgcca 6600
gcaacgcggc cttttacgg ttcctggcct tttgctggcc ttttgctcac atgttctttc 6660
ctgcgttatc ccctgattct gtggataacc gtattaccgc ctttgagtga gctgataccg 6720
ctcgccgcag ccgaacgacc gagcgcagcg agtcagtgag cgaggaagcg gaagagcgcc 6780
tgatgcggta ttttctcctt acgcatctgt gcggtatttc acaccgcata tatggtgcac 6840
tctcagtaca atctgctctg atgccgcata gttaagccag tatacactcc gctatcgcta 6900
cgtgactggg tcatggctgc gccccgacac ccgccaacac ccgctgacgc gccctgacgg 6960
gcttgtctgc tcccggcatc cgcttacaga caagctgtga ccgtctccgg gagctgcatg 7020
tgtcagaggt tttcaccgtc atcaccgaaa cgcgcgaggc agctgcggta aagctcatca 7080
gcgtggtcgt gaagcgattc acagatgtct gcctgttcat ccgcgtccag ctcgttgagt 7140
ttctccagaa gcgttaatgt ctggcttctg ataaagcggg ccatgttaag gcggtttttt 7200
tcctgtttgt tcactgatgc ctccgtgtaa ggggatttc tgttcatggg ggtaatgata 7260
ccgatgaaac gagagaggat gctcacgata cgggttatcg atgatgaaca tgcccggtta 7320
ctggaacgtt gtgagggtaa acaactggcg gtatggatgc ggcgggacca gagaaaaatc 7380
actcagggtc aatgccagcg cttcgttaat acagatgtag gtgttccaca gggtagccag 7440
cagcatcctg cgatgcagat ccggaacata tggtgcagg cgctgactt ccgcgtttcc 7500
agactttacg aaacacggaa accgaagacc attcatgttg ttgctcaggt cgcagacgtt 7560
ttgcagcagc agtcgcttca cgttcgctcg cgtatcggtg attcattctg ctaaccagta 7620
aggcaaccc gccagcctag ccgggtcctc aacgacagga gcacgatcat gctagtcatg 7680
ccccgcgccc accggaagga gctgactggg ttgaaggctc tcaagggcat cggtcgagat 7740
cccggtgcct aatgagtgag ctaacttaca ttaattgcgt tgcgctcact gcccgctttc 7800
cagtcgggaa acctgtcgtg ccagctgcat taatgaatcg gccaacgcgc ggggagaggc 7860
ggtttgcgta ttgggcgcca gggtggtttt tcttttcacc agtgagacgg gcaacagctg 7920
attgccctc accgctggc cctgagagag ttgcagcaag cggtccacgc tggtttgccc 7980
cagcaggcga aaatcctgtt tgatggtggt taacggcggg atataacatg agctgtcttc 8040
ggtatcgtcg tatcccacta ccgagatgtc cgcaccaacg ccagcccgg actcggtaat 8100
ggcgcgcatt gcgcccagcg ccatctgatc gttggcaacc agcatcgcag tgggaacgat 8160
gccctcattc agcatttgca tggtttgttg aaaaccggac atggcactcc agtcgccttc 8220
ccgttccgct atcggctgaa tttgattgcg agtgagatat ttatgccagc cagccagacg 8280
cagacgcgc gagacagaac ttaatgggcc cgctaacagc gcgatttgct ggtgacccaa 8340
tgcgaccaga tgctccacgc ccagtcgcgt accgtcttca tgggagaaaa taatactgtt 8400
gatgggtgtc tggtcagaga catcaagaaa taacgccgga acattagtgc aggcagcttc 8460
cacagcaatg gcatcctggt catccagcgg atagttaatg atcagcccac tgacgcgttg 8520
cgcgagaaga ttgtgcaccg ccgctttaca ggcttcgacg ccgcttcgtt ctaccatcga 8580
caccaccacg ctggcaccca gttgatcggc gcgagattta atcgccgcga caatttgcga 8640
cggcgcgtgc agggccagac tggaggtggc aacgccaatc agcaacgact gtttgcccgc 8700
cagttgttgt gccacgcggt tgggaatgta attcagctcc gccatcgccg cttccacttt 8760
ttcccgcgtt ttcgcagaaa cgtggctggc ctggttcacc acgcgggaaa cgg         8813
```

```
SEQ ID NO: 60          moltype = DNA   length = 1963
FEATURE                Location/Qualifiers
source                 1..1963
                       mol_type = other DNA
                       organism = synthetic construct
SEQUENCE: 60
atgagcgtta acctggcgag ccagctgcgt gaaggcacca aaaaatctca ctctatggcg 60
gaaaacgttg gtttcgttaa atgcttcctg aaaggtgttg ttgagaaaaa cagctaccgt 120
aaactggttg gtaacctgta cttcgtttac agcgcgatgg aagaagaaat ggcgaaattc 180
aaagatcacc cgatcctgtc tcacatctac ttcccggaac tgaaccgtaa acagtctctg 240
gaacaggatc tgcagttcta ctatggtagc aactggcgtc aggaagttaa aatctctgcg 300
gcgggtcagg cgtacgttga tcgcgttcgt caggttgcg cgaccgcgcc ggaactgcta 360
gttgcgcaca gctacacccg ttacctgggc gatctgagcg gcggccagat cctgaagaaa 420
atcgcgcaga acgcgatgaa cctgcacgat ggtggcaccg cgttctacga attcgcagat 480
atcgatgatg aaaaagcgtt caaaacacc taccgtcagg ctatgaacga tctgccgatc 540
gatcaggcga ccgcggaacg tatcgttgat gaagcgaacg atggcgttcg gatgaacatg 600
aaaatgttca cagaactgga aggtaacctg atcaaagcat cggcatcat ggttttcaac 660
tctctgaccc gtcgtcgtag ccagggcagc accgaagttg gtctggcgac ctctgaaggc 720
taagtcgaca agcttggtgg cggcggcgga tcaggtggtg gtggtcagg tggtggtggt 780
tcaggtggtg gtggttgtgg tagcctgcgt gaatgtgaac tgtatgttca gaaacataat 840
attcaggccc tgctgaaaga tagcattgtt cagctgtgta ccgcacgtcc ggaacgtccg 900
atggcattt gcgcgaata ttttgaacgt ctggaaaaag aagaagccaa acgaacgaa 960
agtaatcgta ttgtacacgg ccgcataatc gaaattaata cgactcacta taggggaatt 1020
gtgagcggat aacaattcc catcttagta tattagttaa gtataagaag gagatatagg 1080
tggtggtggt tcaggtggtg gtggttcagg tggtggtggt tgtggtctgg aacagtatgc 1140
aaatcagctg gcagatcaga ttatcaaaga agcaaccgaa ggttgcgtcg acaagcttgg 1200
tggcggcggc ggatcaatgg cggttaccga tctgtcctg accaacagca gcctgatgcc 1260
```

```
gaccctgaac ccgatgatcc agcagctggc gctggcgatc gcggcgtctt ggcagagcct    1320
gccgctgaaa ccgtaccagc tgccggaaga tctgggttac gttgaaggcc gtctggaagg    1380
tgaaaaactg gttatcgaaa accgttgcta ccagacsccg cagttccgta aaatgcacct    1440
ggaactggca aaagtgggca aaggtctgga tatcctgcac tgcgttatgt tcccggaacc    1500
gctgtacggc ctgccgctgt tcggttgcga tatcgttgcg ggtccgggtg gtgttagcgc    1560
ggctatcgcg gatctgtctc cgacccagtc tgatcgtcag ctgccggcgg cgtaccagaa    1620
atctctggcg gaactgggtc agccggaatt cgaacagcag cgtgaactgc cgccgtgggg    1680
tgaaatcttc tctgaatact gcctgttcat tcgtccgtct aacgttaccg aagaagaacg    1740
tttcgttcag cgtgttgttg atttcctgca gatccactgc caccagagca tcgtggcgga    1800
accgctgagc gaagcgcaga ccctggaaca ccgtcagggc cagatccact actgccagca    1860
gcagcagaaa aacgataaaa cccgtcgtgt tctggaaaaa gcgttcggcg aagcgtgggc    1920
ggaacgttac atgtctcagg ttctgttcga tgttatccag taa                      1963
```

METHOD FOR PRODUCING PHYCOCYANOBILIN USING A RECOMBINANT ESCHERICHIA COLI

CROSS-REFERENCE TO RELATED APPLICATIONS

This application claims the benefit of Chinese patent application No. 2023100955399, filed Feb. 10, 2023, the content of which is incorporated by reference herein.

BACKGROUND OF THE INVENTION

Field of the Invention

The present invention relates to a method for producing phycocyanobilin by use of a recombinant *Escherichia coli*, belonging to the technical fields of genetic engineering and bioengineering.

Description of the Related Art

Phycocyanobilin is a natural pigment of some algae. Due to its special spectroscopic properties, it is widely used as an excellent fluorescent probe in the fields such as immune disease diagnosis and photodynamic therapy. Furthermore, because of its anti-inflammatory activity, antioxidant activity, ability to eliminate free radicals and other functions, it also has great potential for applications in the field of food, cosmetics, and medical and healthcare products. As an important industrial microorganism, *E. coli* has many advantages such as fast reproduction speed, clear genetic background, and mature gene editing technology, and is an important host strain for heterologous protein expression. Therefore, *E. coli* is an ideal host strain to be used for synthesis of the phycocyanobilin. Biosynthesis of the phycocyanobilin starts from 5-aminolevulinic acid (ALA). A synthesis pathway of the ALA in the *E. coli* is a pathway C5, and glutamic acid is transformed into the ALA through the pathway C5. Two molecules of ALA are catalyzed by porphobilinogen synthase to generate one molecule of porphobilinogen (PBG), four molecules of PBG are catalyzed by porphobilinogen deaminase to form 1-hydroxymethylbilane (HMB), and the 1-hydroxymethylbilane (HMB) is cyclized by uroporphyrinogen synthase to form uroporphyrinogen III; subsequently, the decarboxylation and oxidation reactions catalyzed by porphyrinogen III decarboxylase, co-porphyrinogen III oxidase, and protoporphyrinogen oxidase convert porphyrinogen III to protoporphyrin IX; and finally, ferrochelatase intercalates iron ions into protoporphyrin to form heme. After the formation of heme, heme oxygenase (Ho1) degrades heme to biliverdin IX by a redox reaction using oxygen, which releases one molecule of CO. After the biliverdin is catalyzed by ferredoxin oxidoreductase (PcyA), free phycocyanobilin (Free PCB) is finally generated.

At present, the phycocyanobilin is mainly extracted from *spirulina*. Crude phycocyanobilin is obtained by carrying out pyrolysis on the *spirulina* with methanol, and then purer phycocyanobilin is obtained through separation and purification. However, the long period of pyrolysis by the methanol not only requires a large amount of *spirulina* as a raw material, but also consumes a large amount of energy to provide heat. Therefore, there is a need for a genetic engineering technology in which the single and purer PCB can be extracted by fermentation of recombinant *E. coli*, thereby avoiding the complicated process of extracting the phycocyanobilin from the *spirulina*, and reducing the cost of *spirulina* pyrolysis.

SUMMARY OF THE INVENTION

The present invention provides a recombinant strain conducive to accumulation of phycocyanobilin, which reduces production costs of the phycocyanobilin and has the potential for industrial production.

In one embodiment of the invention, it provides a strain of recombinant *E. coli* for synthesis of phycocyanobilin, which heterologously expresses ho1 and pcyA genes derived from *Synechocystis* sp. PCC6803 using BL21 (DE3) as an original strain.

In one embodiment, the ho1 and pcyA genes are expressed by using pRSFDuet-1 as an expression vector.

In one embodiment, the ho1 and pcyA genes are expressed through fusion of short peptide tags RIDD and RIAD.

In one embodiment, the recombinant *E. coli* further enhances synthesis of heme.

In one embodiment, the recombinant *E. coli* further undergoes at least one of the following improvements:

(1) overexpression of endogenous genes hemB (Gene ID: 945017, SEQ ID NO:7), hemC (Gene ID: 947759, SEQ ID NO:8), and hemD (Gene ID: 948587, SEQ ID NO:9) in the *E. coli* BL21 (DE3); and (2) overexpression of endogenous genes hemE (Gene ID: 948497, SEQ ID NO:10), hemF (Gene ID: 946908, SEQ ID NO:11), hemG (Gene ID: 948331, SEQ ID NO:12), and hemH (Gene ID: 947532, SEQ ID NO:13) in the *E. coli* BL21 (DE3).

In one embodiment, according to the recombinant *E. coli*, under conditions that the BL21 (DE3) is used as the original strain and the pRSFDuet-1 is used as the expression vector, a gene encoding the heme oxygenase ho1 as shown in SEQ ID NO:1 and a gene encoding the ferredoxin oxidoreductase pcyA as shown in SEQ ID NO:2 are expressed, and the endogenous genes hemB, hemC, and hemD as well as the endogenous genes hemE, hemF, hemG, and hemH in the *E. coli* BL21 (DE3) are overexpressed; and the heme oxygenase ho1 and the ferredoxin oxidoreductase pcyA are expressed through fusion of short peptide tags RIDD as shown in SEQ ID NO:3 and RIAD as shown in SEQ ID NO:4.

In one embodiment, integrative expression of the gene hemB derived from the *E. coli* results in asymmetric condensation of ALA into a mono-pyrrole compound porphobilinogen.

In one embodiment, integrative expression of the gene hemC derived from the *E. coli* results in conversion of the porphobilinogen into destabilized linear tetrapyrrole, that is, hydroxymethylcholane.

In one embodiment, integrative expression of the gene hemD derived from the *E. coli* results in cyclization of the hydroxymethylcholane into tetrapyrrole-ring uroporphyrinogen III.

In one embodiment, integrative expression of the gene hemE derived from the *E. coli* decarboxylates four acetate chains of the uroporphyrinogen III to form coproporphyrinogen III.

In one embodiment, integrative expression of the gene hemF derived from the *E. coli* decarboxylates the coproporphyrinogen III to produce protoporphyrinogen IX.

In one embodiment, integrative expression of the gene hemG derived from the E. coli allows the protoporphyrinogen IX to be oxidized to protoporphyrin IX by mediating six electrons.

In one embodiment, integrative expression of the gene hemH derived from the E. coli chelates ferrous ions into the macrocycle of the protoporphyrin IX to form heme.

In one embodiment, the short peptide tags RIDD and RIAD are fused at the C-terminal of the Ho1 and the N-terminal of the PcyA, so that a multi-enzyme complex is constructed, and the synthesis of phycocyanobilin is further enhanced.

In one embodiment, the gene hemEFGH is integrated at a position where a heme degrading gene yfeX is located.

In one embodiment, the gene hemBCD is integrated at an arsB site of an arsenate transporter gene.

In one embodiment, nucleotide sequences of genes encoding the heme oxygenase ho1 and the ferredoxin oxidoreductase pcyA are respectively shown in SEQ ID NO:1 and SEQ ID NO:2.

In one embodiment, nucleotide sequences of the short peptide tags RIDD and RIAD are as shown in SEQ ID NO:3 and SEQ ID NO:4, respectively.

In one embodiment, a nucleotide sequence of the gene hemBCD encoding the genes hemB, hemC and hemD is shown in SEQ ID NO:5.

In one embodiment, a nucleotide sequence of the gene hemEFGH encoding the genes hemE, hemF, hemG and hemH is shown in SEQ ID NO:6.

In one embodiment of the invention, it provides a method for producing phycocyanobilin, wherein the recombinant E. coli above is fermented to produce the phycocyanobilin.

In one embodiment, the recombinant E. coli is inoculated into a fermentation system and cultured at 35-37° C. for 2-3 hr, 0.5 mM IPTG is added, synthesis of the phycocyanobilin is induced and carried out at 25° C. and 200-220 rpm, and fermentation is carried out for 24-48 hr.

In one embodiment, it provides a fermentation medium containing 6 g $KH_2PO_4$, $K_2HPO_4 \cdot 3H_2P$, $(NH_4)_2SO_4$, anhydrous citric acid, $MgSO_4$, yeast powder, glycerol, maltodextrin, vitamin B1, and a trace element solution.

In one embodiment, the trace solution contain Fe(III) citrate, $ZnCl_2$, $MnSO_4 \cdot H_2O$, $CuSO_4 \cdot 5H_2O$, $Na_2MoO_4 \cdot 2H_2O$, $CaCl_2 \cdot 2H_2O$, $H_3BO_3$, $CoCl_2 \cdot 6H_2O$, and $NiSO_4 \cdot 6H_2O$.

Beneficial Effects

According to the present disclosure, heterologous expression of ho1 and pcyA genes derived from Synechocystis sp. PCC6803 converts heme to an intermediate biliverdin for phycocyanobilin synthesis, and reduces accumulation of the intermediate product biliverdin for the phycocyanobilin synthesis. A genome of the E. coli is further transformed, and a strain of recombinant E. coli with high yield of phycocyanobilin is obtained by overexpressing the related genes in a metabolic pathway of the phycocyanobilin. The recombinant strain is cultured for 36 hr in a system with cheap glycerol as a substrate, and the phycocyanobilin yield can reach 147 mg/L.

Figure 1:
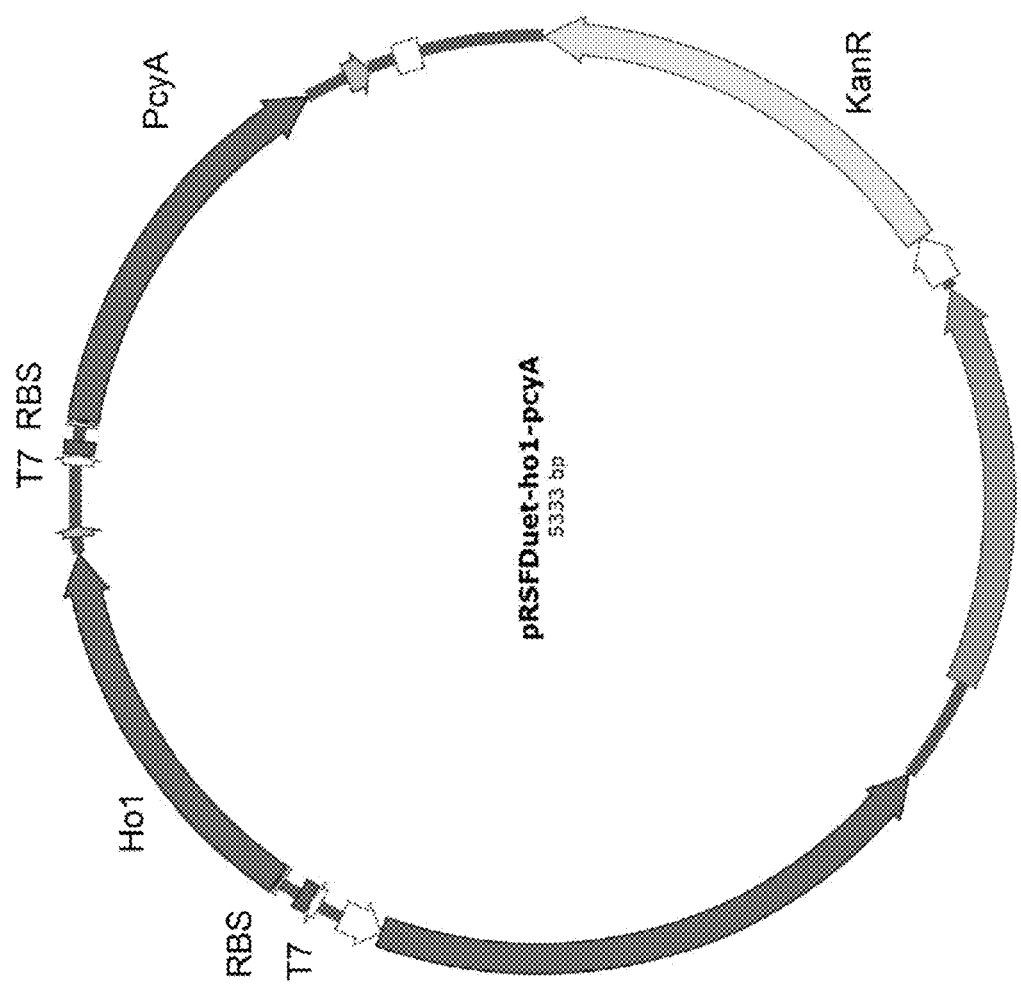
FIG. 1 shows a plasmid map of a recombinant vector pRSFDuet-ho1-pcyA.
Figure 2:
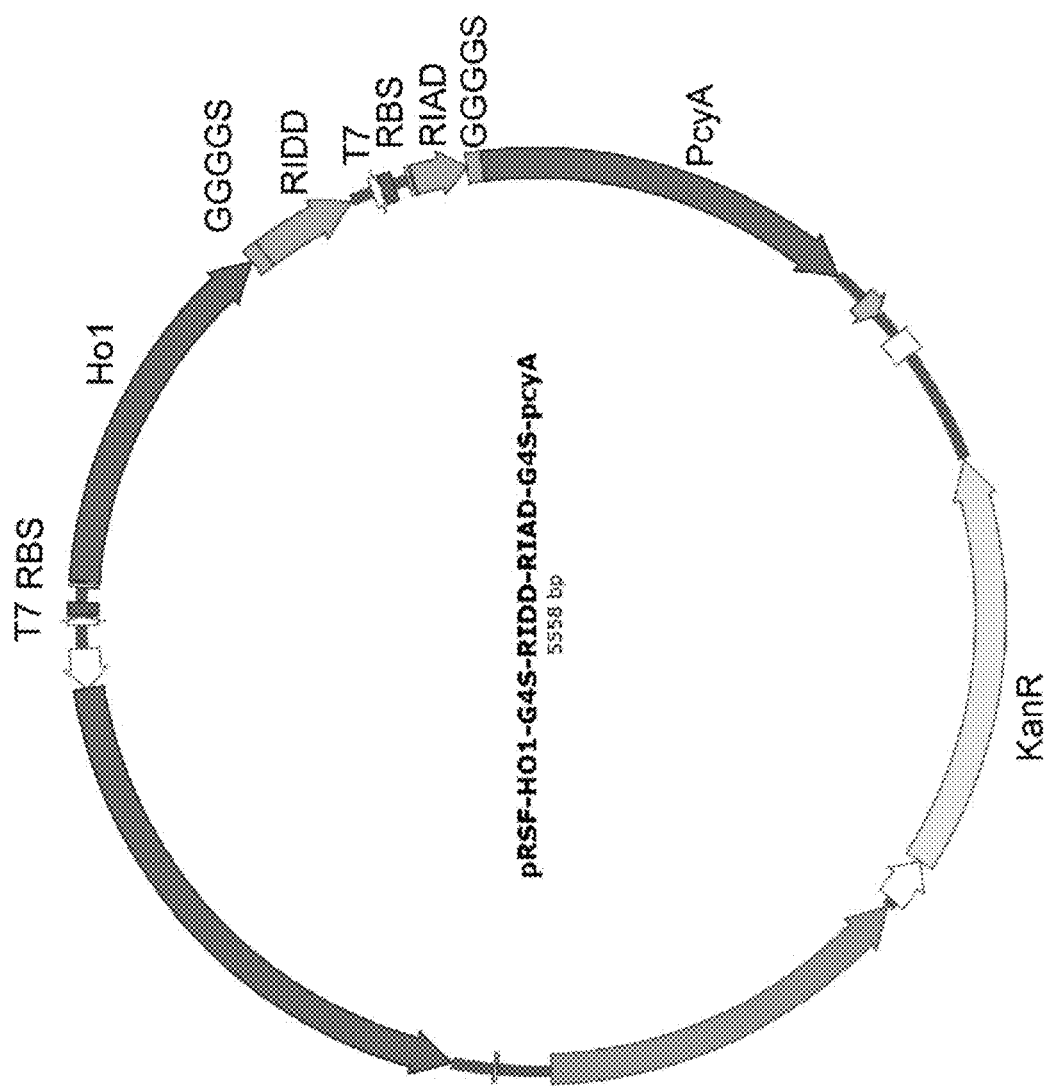
FIG. 2 shows a plasmid map of a recombinant vector pRSFDuet-ho1-RIDD-RIAD-pcyA.
Figure 3:
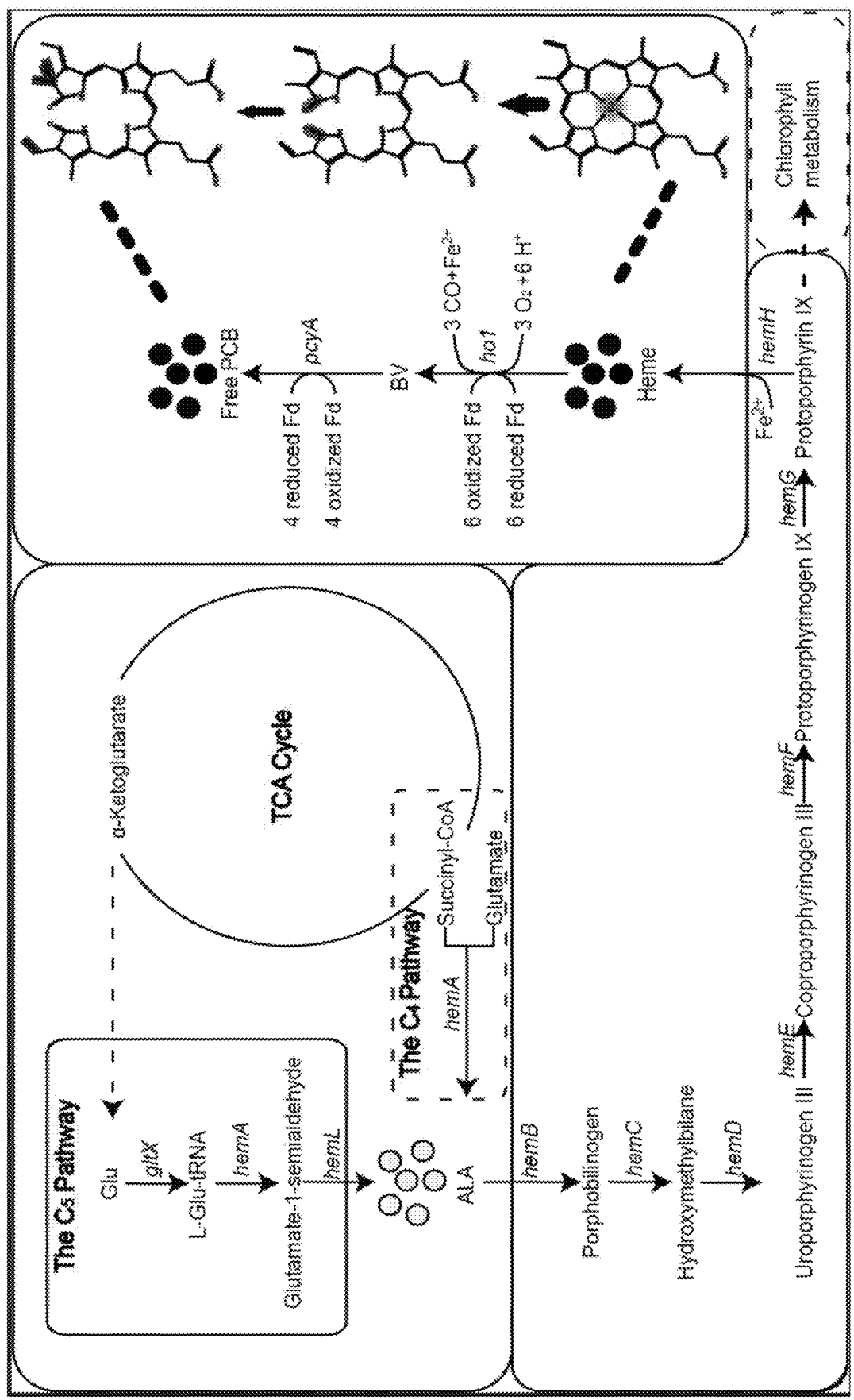
FIG. 3 shows a synthetic route diagram of phycocyanobilin synthesized by using E. coli.

DETAILED DESCRIPTION OF THE INVENTION (1) Medium

LB medium: 5 g/L yeast extract powder, 10 g/L peptone, and 10 g/L sodium chloride. 15 g/L agar was added during the preparation of the LB solid medium.

Fermentation medium (per L): 6 g $KH_2PO_4$, 16.4 g $K_2HPO_4 \cdot 3H_2O$, 5 g $(NH_4)_2SO_4$, 1 g anhydrous citric acid, 1 g $MgSO_4 \cdot 7H_2O$, 10 g yeast powder, 30 g glycerol, 10 g maltodextrin, 0.1 g vitamin B1, and 1 mL a trace element solution.

Trace element solution: 100 g/L Fe(III) citrate, 18 g/L $ZnCl_2$, 14.64 g/L $MnSO_4 \cdot H_2O$, 0.75 g/L $CuSO_4 \cdot 5H_2O$, 2 g/L $Na_2MoO_4 \cdot 2H_2O$, 2 g/L $CaCl_2 \cdot 2H_2O$, 3.0 g/L $H_3BO_3$, 2.5 g/L $CoCl_2 \cdot 6H_2O$, 2.5 g/L $NiSO_4 \cdot 6H_2O$, and 100 mL HCl.

(2) PCR reaction system and amplification conditions: a forward primer (10 μM): 1 μL, a reverse primer (10 μM): 1 μL, template DNA: 10-50 ng, 2×Phanta Max Master Mix: 25 μL, and double distilled water added to 50 μL. Amplification conditions: pre-deformation at 95° C. for 3 min, followed by 30 cycles (at 95° C. for 15 s, at 55° C. for 15 s, at 72° C. for 15 s), with an extension at 72° C. for 5 min.

A seamless cloning reaction system was as follows: 40 ng a target gene, 100 ng a vector added, 5 μL reaction enzyme mixture, and sterile ultrapure water added to make up to 10 μL. The reaction conditions were as follows: a reaction was performed at 50° C. for 60 min, and the product was placed on ice immediately after the reaction was finished. 10 μL of the product was transformed into E. coli competent cells JM109.

(3) The Competent Cell Preparation Kit of TaKaRa (TaKaRa, Dalian, China) was used to prepare the E. coli competent cells. Please refer to the instructions for the specific operation process. The prepared competent cells were preserved at −80° C., and subsequently could be transformed into plasmids, fragments, or the like.

(4) Chemical transformation method for E. coli: E. coli JM109 was streaked on a solid LB plate and cultured at 37° C. for 12 hr; single colonies were selected and inoculated into a liquid LB medium, allowed to grow at 37° C. and 220 rpm for 10 hr, and then transferred and inoculated into a fresh 25 mL liquid LB medium at an inoculation amount of 1%; the inoculated colonies were incubated at 37° C. for 1.5-2 hr; and when the $OD_{600}$ grew to 0.6-1, the cells were collected to produce competent cells.

(5) HPLC detection of phycocyanobilin: a chromatographic column (250×4.6 mm, m, Thermo-Fisher, Waltham, MA) was employed, and a concentration of the phycocyanobilin was determined at 380 nm using a high performance liquid chromatography system (Waters Corporation, Milfold, MA) and a UV detector (Waters 2487). An initial mobile phase consisted of 40% solvent A (acetonitrile containing 0.1% trifluoroacetic acid) and 60% solvent B (0.1% trifluoroacetic acid in water). The solvent gradient: 40% solvent B 0 min, 55% solvent B 30 min with a flow rate of 0.8 mL/min. Column temperature: 25° C.

(6) The strain information is shown in Table 1:

TABLE 1

Strains and genes used in the present disclosure

| Name of strain | Genotype |
|---|---|
| St07 | E. coli BL21 (DE3), pRSFDuet-T7lac-hol$^S$-T7lac-pcyA$^S$ |
| St17 | E. coli BL21 (DE3) ΔarsB::hemBCD |
| St18 | St 17, pRSFDuet-T7lac-hol$^S$-T7lac-pcyA$^S$ |
| St19 | E. coli BL21 (DE3) ΔarsB::hemBCD ΔyfeX::hemEFGH |
| St20 | St19, pRSFDuet-T7lac-hol$^S$-T7lac-pcyA$^S$ |
| St26 | St19, pRSFDuet-T7lac-hol$^S$-GGGGS-RIDD-RIAD-GGGGS-T7lac-pcyA$^S$ |

Example 1. Synthesis of Key Genes for Phycocyanobilin Biosynthesis

Suzhou Jinweizhi Biotechnology Co., Ltd. carried out full-length chemical synthesis of the following genes: a heme oxygenase Hol gene (KEGG accession number sll1184) derived from *Synechocystis* sp. PCC 6803, with a nucleotide sequence as shown in SEQ ID NO:1, a phycocyanobilin gene derived from *Synechocystis* sp. PCC 6803, a ferredoxin oxidoreductase gene PcyA (KEGG accession number slr0116), with a nucleotide sequence as shown in SEQ ID NO:2, a nucleotide sequence as shown in SEQ ID NO:3 that encodes a short peptide tag RIDD, and a nucleotide sequence as shown in SEQ ID NO:4 that encodes a short peptide tag RIAD.

Example 2. Construction of Gene Expression Cassettes Related to Biosynthesis Pathway of Phycocyanobilin

*E. coli* BL21(DE3) was used as an original strain for the synthesis of phycocyanobilin. First, in order to construct a synthesis pathway of the phycocyanobilin, a synthetic sequence of hol as shown in SEQ ID NO:1 was used as a template, and a primer pair F1/R1 was used for PCR amplification. Phanta MasterMix (Vazyme Company, Nanjin, China) high-fidelity pfu enzyme was selected for pre-denaturation at 95° C. for 3 min. The amplification phase consisted of 30 cycles, which were carried out at 95° C. for 15 s, 55° C. for 15 s, and 72° C. for 30 s, with an extension at 72° C. for 5 min. The PCR product was purified, and a fragment hol was obtained. A vector pRSFDuet-1 was used as a template, and a primer pair F2/R2 was used for PCR amplification. Phanta MasterMix high-fidelity pfu enzyme was selected for pre-denaturation at 95° C. for 3 min. The amplification phase consisted of 30 cycles, which were carried out at 95° C. for 15 s, 55° C. for 15 s, and 72° C. for 2 min, with an extension at 72° C. for 5 min. The PCR product was purified. The fragment hol and the vector pRSFDuet-1 were recombined into a vector pRSFDuet-hol by way of seamless cloning assembly, and transformed into *E. coli* JM109. The obtained vector was sent to Shanghai Sangon Biotech for sequencing, and the correct recombinant vector pRSFDuet-hol was obtained after the comparison was correct.

Figure 4:
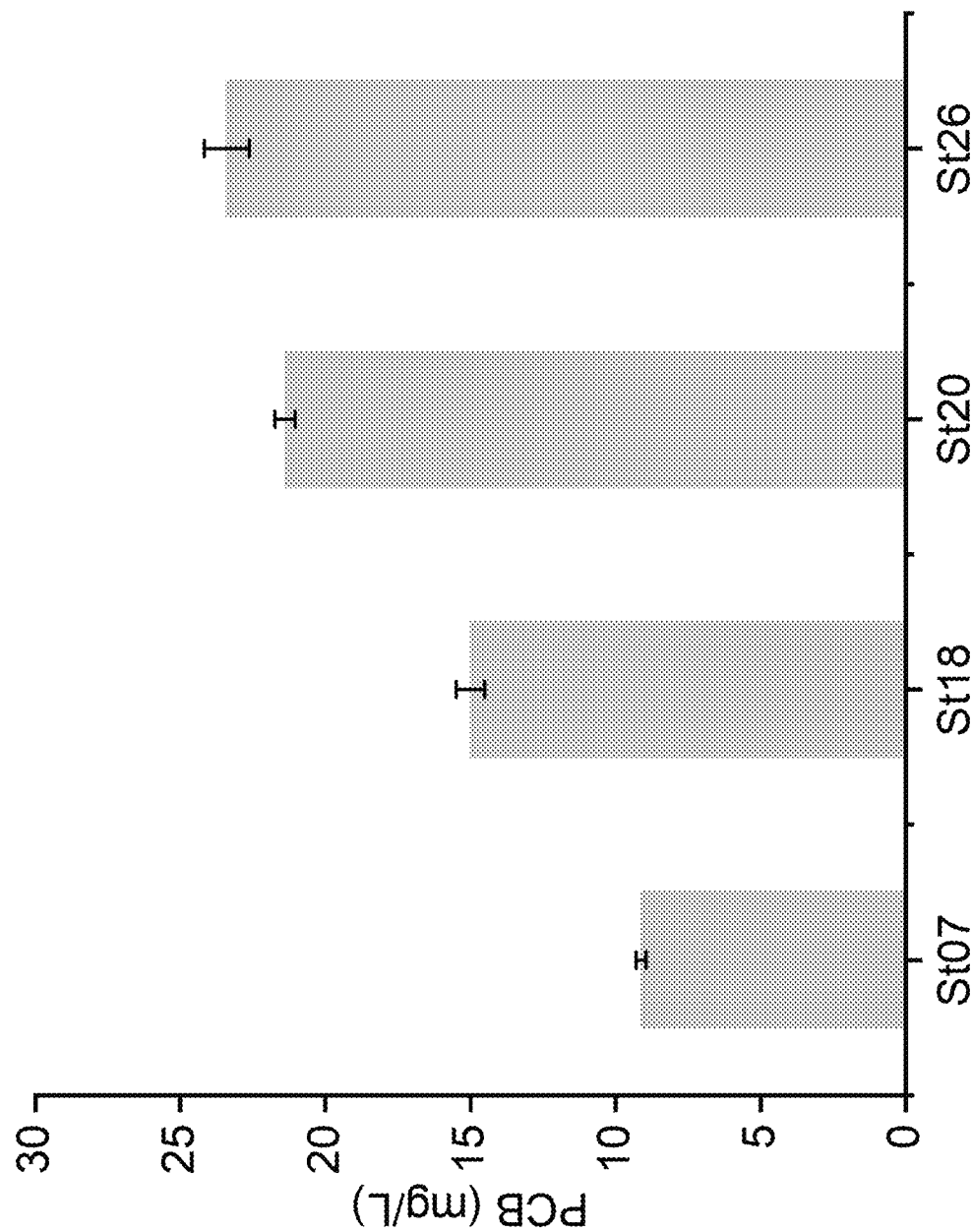
FIG. 4 shows an amount of phycocyanobilin synthesized by shake-flask fermentation of recombinant E. coli.
Figure 5:
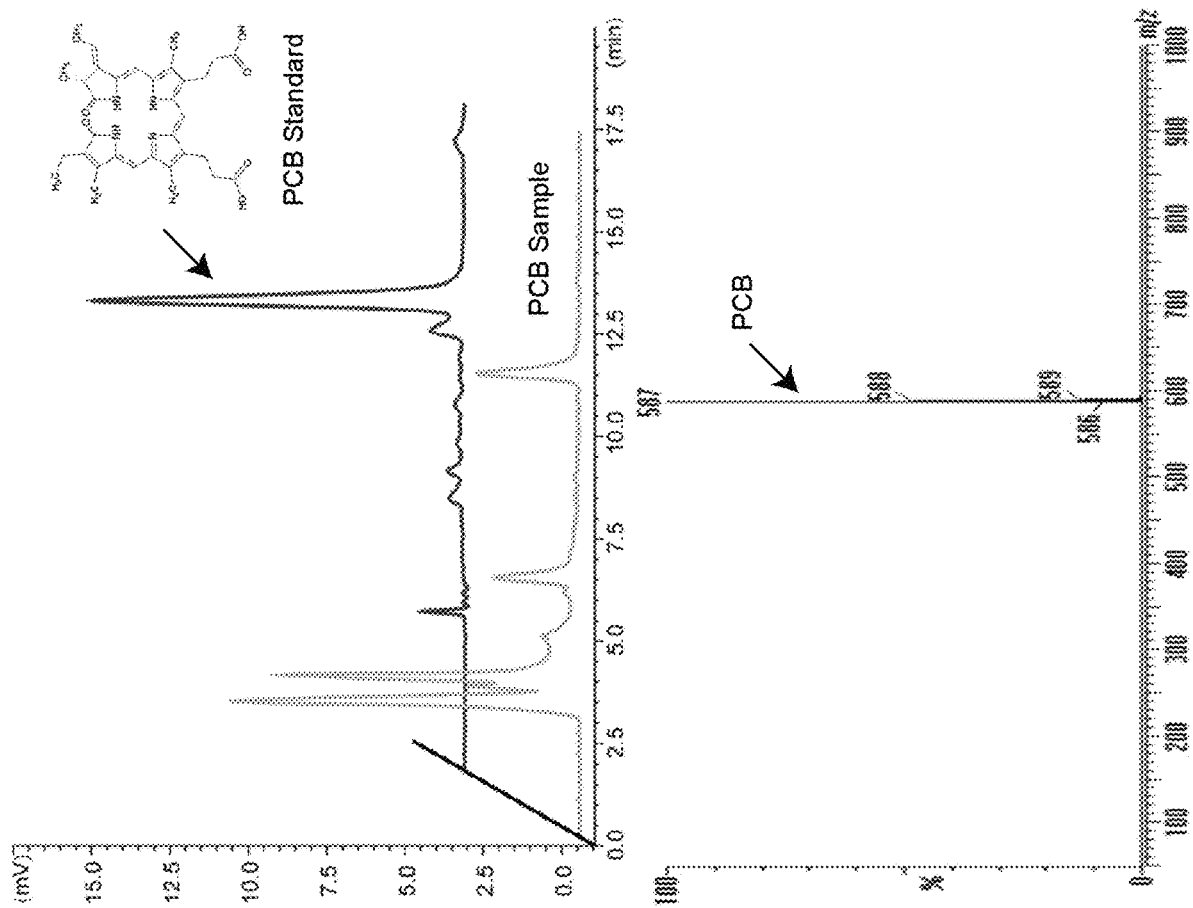
FIG. 5 shows LC-MS diagrams of recombinant E. coli, control, and standard.

A synthetic sequence of pcyA as shown in SEQ ID NO:2 was used as a template, and a primer pair F3/R3 was used for PCR amplification. Phanta MasterMix high-fidelity pfu enzyme was selected for pre-denaturation at 95° C. for 3 min. The amplification phase consisted of 30 cycles, which were carried out at 95° C. for 15 s, 58° C. for 15 s, and 72° C. for 30 s, with an extension at 72° C. for 5 min. The PCR product was purified, and a fragment pcyA was obtained. The recombinant vector pRSFDuet-hol was used as a template, and a primer pair F4/R4 was used for PCR amplification. Phanta MasterMix high-fidelity pfu enzyme was selected for pre-denaturation at 95° C. for 3 min. The amplification phase consisted of 30 cycles, which were carried out at 95° C. for 15 s, 58° C. for 15 s, and 72° C. for 3 min, with an extension at 72° C. for 5 min. The PCR product was purified, and a vector fragment pRSFDuet-hol was obtained. The fragment pcyA and the vector fragment pRSFDuet-hol were recombined into a vector pRSFDuet-hol-pcyA by way of seamless cloning assembly, and the recombined vector was transformed into *E. coli* JM109. The obtained vector was sent to Shanghai Sangon Biotech for sequencing, and the correct recombinant vector pRSFDuet-hol-pcyA was obtained after the correct sequence was confirmed. The recombinant vector pRSFDuet-hol-pcyA was transformed into *E. coli* BL21(DE3) to obtain an engineered strain St07. The engineered strain was cultured in a seed medium at 37° C. and 220 r/min for 12 hr to obtain a seed solution (with $OD_{600}$ being 3±0.2), and then the seed solution was inoculated into a fermentation medium containing kanamycin with a final concentration of 50 μg/mL at an inoculation concentration of 2%. After incubation at 37° C. and 220 rpm for 3 hr, IPTG with a final concentration of 0.5 mM was added. The synthesis of the phycocyanobilin was induced and carried out at 25° C. and 220 rpm, and the fermentation period was 48 hr. As shown in FIG. 4, the yield of the phycocyanobilin in the fermentation broth of the St07 was 9.1 mg/L.

TABLE 2

Primer sequence

| Primer | Sequence 5'-3' (Underlined for the homologous arm region) | SEQ ID NO. |
|---|---|---|
| F1 | TAAGGAGATATAATGAGCGTTAACCTGGCGAGCCA | SEQ ID NO: 14 |
| R1 | TTGGTCTGGCGACCTCTGAAGGCTAACGAACAGAAAGTAATCGTATTGTA | SEQ ID NO: 15 |
| F2 | CGAACAGAAAGTAATCGTATTGT | SEQ ID NO: 16 |
| R2 | AGGTTAACGCTCATTATATCTCCTTATTAAAGTTAAACAAAATT | SEQ ID NO: 17 |
| F3 | ATATAATGGCGGTTACCGATCTGTCTCTGA | SEQ ID NO: 18 |

TABLE 2-continued

Primer sequence

| Primer | Sequence 5'-3' (Underlined for the homologous arm region) | SEQ ID NO. |
| --- | --- | --- |
| R3 | GTTCTGTTCGATGTTATCCAGTAAGCAGATCTCAATT GGATATCGGCCG | SEQ ID NO: 19 |
| F4 | ATTAGTTAAGTATAAGAAGGAGATATAATGGCGGTT ACCGATCTGTC | SEQ ID NO: 20 |
| R4 | GCAGATCTCAATTGGATATCGGCCG | SEQ ID NO: 21 |

Example 3. Enhancement of Endogenous Heme Synthesis Pathway

Since heme is a direct precursor for phycocyanobilin synthesis, an endogenous gene hemBCD (with a nucleotide sequence as shown in SEQ ID NO:5) of the *E. coli* was overexpressed and integrated at an arsB site of an arsenate transporter gene of *E. coli* so as to increase the supply of heme.

A primer pair F5/R5 was used to amplify a gene fragment PT7-lacO-RBS-hemB-PT7-lacO-RBS-hemCD with plasmid pRSF-hemBCD (published in the paper: Xinrui Zhao, Kyeong Rok Choi, Sang Yup Lee*. *Metabolic engineering of Escherichia coli for secretory production of free haem. Nature Catalysis.* 2018, 1: 720-728, with a nucleotide sequence as shown in SEQ ID NO:58). Using an *E. coli* BL21 (DE3) genome as a template, primer pairs F6/R6 and F7/R7 were used to amplify about 500 bp homologous arms U1 and D1 upstream and downstream of the arsB site, respectively, and the fragments were purified. Using the purified fragments U1 and D1 as templates, an integration cassette U-PT7-lacO-RBS-hemB-PT7-lacO-RBS-hemCD-D1 was stepwise obtained by amplification with primer pairs F8/R8 and F9/R9, and the fragment was purified. In order to obtain pTarget-arsB for the integration at the arsB site, pTarget was used as a template, a primer F10/R10 was used for amplification, and the fragment was purified. The purified fragment was transformed into *E. coli* JM109, the plasmid was extracted and sequenced for verification, and a correct recombinant vector pTarget-arsB was obtained.

In order to prepare the *E. coli* BL21 (DE3) electrocompetent cells containing pCas, the plasmid pCas was transformed into *E. coli* BL21 (DE3) chemical competent cells. Single clones obtained from the transformation were picked and put into a 4 mL LB medium, kanamycin with a final concentration of 50 μg/mL was added, and incubation was carried out at 30° C. for 12 hr. Then, the bacterial liquid was inoculated into a 50 mL LB medium at an inoculation concentration of 2%, and the kanamycin with the final concentration of 50 μg/mL and a 10 mM arabinose solution were added. After incubation at 30° C. and 220 rpm for 4-6 hr, when $OD_{600}$ reached 0.6, the bacterial liquid was transferred to a 50 ml centrifuge tube, and stood still on ice for 15 min. Centrifugation was carried out at 4° C. and 4000 rpm for 10 min to remove supernatant, and 10 mL of 10% glycerol was added for resuspending; the operation was repeated twice, and the product was packaged according to 100 μL/part and then stored at −80° C. 400 ng recombinant vector pTarget-arsB and 1200 ng integration cassette U-PT7-lacO-RBS-hemB-PT7-lacO-RBS-hemCD-D1 were added into the *E. coli* BL21 (DE3) electrocompetent cells, and the mixture stood still on ice for 10 min, was then transferred into a 1 mm electric cup that had been pre-cooled for 10 min, and was subjected to electric shock with a voltage of 1.8 kv. After the electric shock, the product was put into a 1 ml LB liquid medium, and cultured at 30° C. for 1.5 hr. A primer pair F11/R11 was used for colony PCR verification. Verified single clones were used to knockout pTarget-arsB and pCas9 according to a published method, and an engineered strain *E. coli* BL21 (DE3) ΔarsB::hemBCD was thus obtained. The recombinant vector pRSFDuet-ho1-pcyA was transformed into *E. coli* BL21(DE3) ΔarsB::hemBCD to obtain the engineered strain St18. The engineered strain St18 was cultured in a seed medium at 37° C. and 220 rpm for 12 hr to obtain the seed solution (with $OD_{600}$ being 3±0.2), and then the seed solution was inoculated into a fermentation medium containing 50 μg/mL kanamycin at an inoculation concentration of 2%. After incubation at 37° C. and 220 rpm for 3 hr, IPTG with a concentration of 0.5 mM was added. The synthesis of the phycocyanobilin was induced and carried out at 25° C. and 220 rpm for 48 hr. As shown in FIG. 4, the yield of the phycocyanobilin in the fermentation broth of the St18 was 15.0 mg/L.

In order to further increase the supply of heme, an endogenous gene hemEFGH (with a corresponding nucleotide sequence as shown in SEQ ID NO:6) of the *E. coli* was overexpressed and integrated at a yfeX site. A primer pair F12/R12 was used to amplify a gene fragment PT7-lacO-RBS-hemEFG-PT7-lacO-RBS-hemH with plasmid pET-hemEFGH (published in the paper: Xinrui Zhao, Kyeong Rok Choi, Sang Yup Lee*. *Metabolic engineering of Escherichia coli for secretory production of free haem. Nature Catalysis.* 2018, 1: 720-728, with a nucleotide sequence as shown in SEQ ID NO:59); Using an *E. coli* BL21 (DE3) genome as a template, primer pairs F13/R13 and F14/R14 were used to amplify about 500 bp homologous arms U1 and D1 upstream and downstream of the yfeX site, respectively, and the fragments were purified, Using the purified fragments U2 and D2 as templates, an integration cassette U2-PT7-lacO-RBS-hemEFG-PT7-lacO-RBS-hemH-D2 was stepwise obtained by amplification with primer pairs F15/R15 and F16/R16, and the fragment was purified. In order to obtain pTarget-yfeX for the integration at the yfeX site, the plasmid pTarget was used as a template, a primer F17/R17 was used to amplify, and the fragment was purified; and the purified fragment was transformed into *E. coli* JM109, the plasmid was extracted and sequenced for verification, and a correct recombinant vector pTarget-yfeX was obtained.

TABLE 3

Primer sequence

| Primer | Sequence 5'-3'<br>(Underlined for the homologous arm region) | SEQ ID NO. |
|---|---|---|
| F5 | gaattttcagatgtgttttatccgggaggcattgatctcgacgctctcccttatgc | SEQ ID NO: 22 |
| R5 | ctaaacgggtcttgaggggttttttgtgagatactgatatgagcaacattac | SEQ ID NO: 23 |
| F6 | ctattaccttcctctgcacttacacattcg | SEQ ID NO: 24 |
| R6 | gatgtgttttatccgggaggcatt | SEQ ID NO: 25 |
| F7 | tgagatactgatatgagcaacattaccatttatcacaac | SEQ ID NO: 26 |
| R7 | gttatttgtaggcctgacaggcgtagcgcatcaggc | SEQ ID NO: 27 |
| F8 | gttagataagaactctctcactccctattaccttcctctgcacttacacattcg | SEQ ID NO: 28 |
| R8 | ctaaacgggtcttgaggggttttttgtgagatactgatatgagcaacattac | SEQ ID NO: 29 |
| F9 | gggtcttgaggggttttttgtgagatactgatatgagcaacattaccatttatcacaac | SEQ ID NO: 30 |
| R9 | gttatttgtaggcctgacaggcgtagcgcatcaggc | SEQ ID NO: 31 |
| F10 | aatacgggtaaagtcctgcggttttagagctagaaatagcaagttaaaataag | SEQ ID NO: 32 |
| R10 | ctctaaaaccgcaggactttacccgtattactagtattatacctaggactgagctag | SEQ ID NO: 33 |
| F11 | caatgttagccactggctaatagtattgagc | SEQ ID NO: 34 |
| R11 | ggacgcgataattggaatctcacg | SEQ ID NO: 35 |
| F12 | gatctcgacgctctcccttatgcgact | SEQ ID NO: 36 |
| R12 | tctaaacgggtcttgaggggttttttg | SEQ ID NO: 37 |
| F13 | tctaaacgggtcttgaggggttttttg | SEQ ID NO: 38 |
| R13 | cactttggtggacgacccaaac | SEQ ID NO: 39 |
| F14 | gtgtattacgcagtcaggtacgc | SEQ ID NO: 40 |
| R14 | tggcctttaatcaatgaatcagaaacgc | SEQ ID NO: 41 |
| F15 | tggcctttaatcaatgaatcagaaacgctctaaacgggtcttgaggggttttttg | SEQ ID NO: 42 |
| R15 | caatttaaacatcttagcataaagttttagagctagcactttggtggacgacccaaac | SEQ ID NO: 43 |
| F16 | ataatactagtgttagataagaactctctcactccgtgtattacgcagtcaggtacgc | SEQ ID NO: 44 |
| R16 | cactttggtggacgacccaaaccaatttaaacatcttagcataaagttttagagctag | SEQ ID NO: 45 |
| F17 | tgacggtacagaaaacccgggttttagagctagaaatagcaagttaaaataag | SEQ ID NO: 46 |
| R17 | ctctaaaacccgggttttctgtaccgtcaactagtattatacctaggactgagctag | SEQ ID NO: 47 |
| F18 | gttggcgcaggtggttttactttg | SEQ ID NO: 48 |
| R18 | caatggcgcaattatcgccg | SEQ ID NO: 49 |

Example 4. Construction of Gene Expression Cassettes Related to Multi-Enzyme Complex of Phycocyanobilin Synthetase A synthetic sequence of RIDD as shown in SEQ ID NO:3 was used as a template, and a primer pair F19/R19 was used for amplification. The amplified fragment was purified to obtain a fragment RIDD. A recombinant vector pRSFDuet-ho1-pcyA was used as a template, and a primer pair F20/R20 was used for amplification. Phanta MasterMix high-fidelity pfu enzyme was selected for pre-denaturation at 95° C. for 3 min. The amplification phase consisted of 30 cycles, which were carried out at 95° C. for 15 s, 58° C. for 15 s, and 72° C. for 3 min, with an extension at 72° C. for 5 min. The PCR product was purified, and a recombinant vector backbone pRSFDuet-ho1-pcyA was obtained. The fragment RIDD and the vector backbone pRSFDuet-ho1-pcyA were recombined into a recombinant vector by way of seamless cloning, and the obtained recombinant vector was transformed into *E. coli* JM109; and the plasmid was extracted and sequenced for verification, and a correct recombinant vector pRSF-Duet-ho1-GGGGS-RIDD-pcyA was obtained.

A synthetic sequence of RIAD was used as a template to design a primer pair F21/R21, the primer pair was used for amplification to obtain a fragment RIAD, and the amplified fragment was purified. A recombinant vector pRSFDuet-ho1-GGGGS-RIDD-pcyA was used as a template to design a primer pair F22/R22, and the primer pair was used for amplification. Phanta MasterMix high-fidelity pfu enzyme was selected for pre-denaturation at 95° C. for 3 min. The amplification phase consisted of 30 cycles, which were carried out at 95° C. for 15 s, 58° C. for 15 s, and 72° C. for 3 min, with an extension at 72° C. for 5 min. The PCR product was purified, and a recombinant vector backbone pRSFDuet-ho1-pcyA was obtained. The fragment RIAD and the vector backbone pRSFDuet-ho1-GGGGS-RIDD-pcyA were recombined into a recombinant vector by way of seamless cloning, and the obtained recombinant vector was transformed into *E. coli* JM109; and the plasmid was extracted and sequenced for verification, and a correct recombinant vector pRSFDuet-ho1-GGGGS-RIDD-RIAD-GGGGS-pcyA was obtained. The recombinant vector pRSF-Duet-ho1-GGGGS-RIDD-RIAD-GGGGS-pcyA was transformed into *E. coli* BL21 (DE3) ΔarsB::hemBCDAyfeX::hemEFGH to obtain an engineered strain St26. The engineered strain St26 was cultured in a seed medium at 37° C. and 220 rpm for 12 hr to obtain a seed solution (with $OD_{600}$ being 3±0.2), and then the seed solution was inoculated into a fermentation medium containing 50 μg/mL kanamycin at an inoculation concentration of 2%. After incubation at 37° C. and 220 rpm for 3 hr, IPTG with a concentration of 0.5 mM was added. The synthesis of the phycocyanobilin was induced and carried out at 25° C. and 220 rpm for 48 hr. As shown in FIG. 4, the yield of the phycocyanobilin in the fermentation broth of the St26 was 23.4 mg/L.

tion, and then feeding was started; and in the fermentation process, the dissolved oxygen was controlled at 40%, the feeding flow rate was 20 ml/hr, and the pH was controlled at 7.0±0.03 by automatic dropwise addition of 50% ammonia water.

Feed medium: 50% (v/v) glycerol, 0.1 g/L $FeCl_3$, 6.25 g/L $(NH_4)_2SO_4$, and 15 g/L $MgSO_4·7H_2O$, with feeding flow rate being 20 mL/L.

Figure 6:
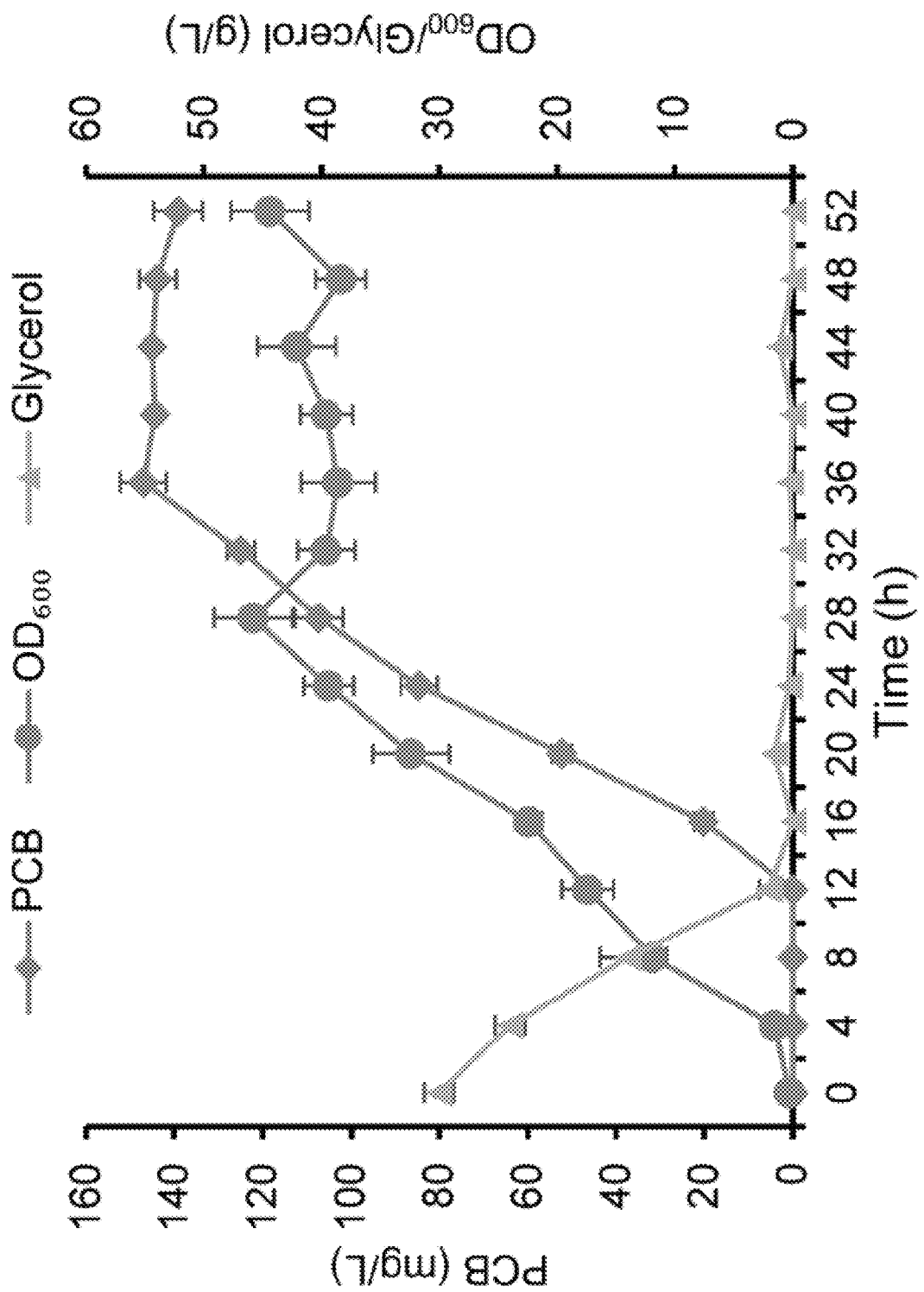
FIG. 6 shows an amount of phycocyanobilin synthesized in a 5 L fermentor.

As shown in FIG. 6, after fermentation for 36 hr, the yield of the phycocyanobilin in the engineered strain can reach 147 mg/L. Compared with the initial strain, the yield of the phycocyanobilin is increased by 51.2%.

Comparative Example 1

The implementation is the same as that in Example 2. The difference is that the pRSFDuet-1 is replaced by the plasmid pETDuet-1, and the results show that the yield of the phycocyanobilin in the constructed recombinant strain is 6.0 mg/L after fermentation for 48 hr.

Comparative Example 2

The implementation is the same as that in Example 2. The difference is that the pRSFDuet-1 is replaced by the plasmid pCDFDuet-1, and the results show that the yield of the

TABLE 4

Primer sequence

| Primer | Sequence 5'-3' (Underlined for the homologous arm region) | SEQ ID NO. |
|---|---|---|
| F19 | AGTCGACAAGCTTGGTGGCGGCGGCGGATCAGGTGGTGGT GGTTCAGGTG | SEQ ID NO: 50 |
| R19 | GAACGTCTGGAAAAAGAAGAAGCCAAACGAACAGAAAGT AATCGTATTGTACACGG | SEQ ID NO: 51 |
| F20 | TGGCGACCTCTGAAGGCTAAGTCGACAAGCTTGGTGGCGG | SEQ ID NO: 52 |
| R20 | TGGAAAAAGAAGAAGCCAAACGAACAGAAAGTAATCGTA TTGTACACGG | SEQ ID NO: 53 |
| F21 | TTGGTGGCGGCGGCGGATCAATGGCGGTTACCGATCTGT | SEQ ID NO: 54 |
| R21 | ATTCCCCATCTTAGTATATTAGTTAAGTATAAGAAGGAGA TATAGGTGGTGGTGGTTCAGGTGG | SEQ ID NO: 55 |
| F22 | AAGTATAAGAAGGAGATATAGGTGGTGGTGGTTCAGGTG | SEQ ID NO: 56 |
| R22 | GATTATCAAAGAAGCAACCGAAGGTTGCGTCGACAAGCTT GGTGGCGGCGGCGGATCA | SEQ ID NO: 57 |

Example 5. 5 L Fermentor Culture

The strain St26 constructed in Example 3 was fermented in a 5 L fermentor system.

Big and round colonies were picked and put into a 250 ml shake flask with 25 mL LB liquid medium, cultured at 37° C. and 220 rpm for 12 hr, then transferred and inoculated into a 250 mL shake flask with 25 mL LB liquid medium at an inoculation concentration of 1%, cultured at 37° C. and 220 rpm for 12 hr, then transferred and inoculated into a 5 L fermentor with 2.5 L liquid medium at an inoculation concentration of 4%, cultured at 37° C. until dissolved oxygen rebounded, and then cooled down to 25° C.; IPTG with a final concentration of 0.5 mM was added for inducphycocyanobilin in the constructed recombinant strain is 5.9 mg/L after fermentation for 48 hr.

Comparative Example 3

The implementation is the same as that in Example 2. The difference is that the pRSFDuet-1 is replaced by the plasmid pACYCDuet-1, and the results show that the yield of the phycocyanobilin in the constructed recombinant strain is 5.2 mg/L after fermentation for 48 hr.

Comparative Example 4

The implementation is the same as that in Example 5. The difference is that the controlled fermentation condition is inoculation for 6-7 hr, and cooling induction is carried out when $OD_{600}$ is about 10. The results show that the yield of the phycocyanobilin is 74 mg/L after fermentation for 52 hr.

Comparative Example 5

The implementation is the same as that in Example 5, except that the feed medium does not contain $FeCl_3$, and the results show that the yield of the phycocyanobilin is 117 mg/L after fermentation for 52 hr.

This application contains a Sequence Listing file, named WX_2023-01NP_SeqListing.xml (85 Kb) created on May 23, 2024, the content of which is incorporated by reference herein.

While the present invention has been described in some embodiments for purposes of clarity and understanding, it is not intended to limit the scope of the invention. One skilled in the art will appreciate that various changes in form and detail can be made without departing from the true scope of the invention. The true scope of the present invention shall only be as defined in the Claims.

What is claimed is:

1. A strain of recombinant *Escherichia coli* (*E. coli*) for synthesis of phycocyanobilin, wherein heme oxygenase ho1 and ferredoxin oxidoreductase pcyA derived from *Synechocystis* sp. PCC6803 are expressed in the strain of the recombinant *E. coli*.

2. The recombinant *E. coli* of claim 1, wherein the heme oxygenase ho1 and the ferrendoxin oxidoreductase pcyA are expressed using pRSFDuet-1 expression vector.

3. The recombinant *E. coli* of claim 1, wherein nucleotide sequences of genes encoding the heme oxygenase ho1 and the ferredoxin oxidoreductase pcyA are shown in SEQ ID NO:1 and SEQ ID NO:2, respectively.

4. The recombinant *E. coli* of claim 1, wherein the heme oxygenase ho1 and the ferredoxin oxidoreductase pcyA are linked together by short peptide tags RIDD and RIAD.

5. The recombinant *E. coli* of claim 1, wherein at least one of the following improvements is made in the recombinant *E. coli*:
   (1) overexpression of endogenous genes hemB, hemC, and hemD; and
   (2) overexpression of endogenous genes hemE, hemF, hemG, and hemH.

6. The recombinant *E. coli* of claim 5, wherein the genes hemB, hemC, and hemD are integrated at an arsB site of an arsenate transporter gene of the recombinant *E. coli*.

7. The recombinant *E. coli* of claim 5, wherein the genes hemE, hemF, hemG and hemH are integrated at a position where a heme degrading gene yfeX is located.

8. The recombinant *E. coli* of claim 4, a fusion gene ho1-GGGGS-RIDD-RIAD-GGGGS-pcyA is expressed in *E. coli* strain BL21 (DE3) using pRSFDuet-1 as the expression vector, wherein endogenous genes hemB, hemC, hemD, hemE, hemF, hemG, and hemH are overexpressed; wherein the nucleotide sequence of the fusion gene ho1-GGGGS-RIDD-RIAD-GGGGS-pcyA is shown in SEQ ID NO:60.

9. The recombinant *E. coli* of claim 7, wherein the genes hemB, hemC and hemD are integrated at an arsB site of an arsenate transporter gene of the recombinant *E. coli*.

10. The recombinant *E. coli* according to claim 8, wherein the genes hemE, hemF, hemG, and hemH are integrated at a position where a heme degrading gene yfeX is located.

11. A method for producing phycocyanobilin, wherein the recombinant *E. coli* of claim 1 is fermented to produce the phycocyanobilin.

12. The method of claim 11, wherein the recombinant *E. coli* is inoculated into a fermentation medium, cultured at 35-37° C. for 2-3 hr, induced with IPTG, and fermented for 24-48 hr.

13. The method of claim 12, wherein 0.5 mM IPTG is added and synthesis of phycocyanobilin is induced and carried out at 25° C., 200-220 rpm for 24-48 hr.

14. The method of claim 12, wherein the fermentation medium contains $KH_2PO_4$, $K_2HPO_4 \cdot 3H_2O$, $(NH_4)_2SO_4$, anhydrous citric acid, $MgSO_4$, yeast powder, glycerol, maltodextrin, vitamin B1, and a trace element solution.

15. The method of claim 14, wherein the trace element solution contains Fe (III) citrate, $ZnCl_2$, $MnSO_4 \cdot H_2O$, $CuSO_4 \cdot 5H_2O$, $Na_2MoO_4 \cdot 2H_2O$, $CaCl_2 \cdot 2H_2O$, $H_3BO_3$, $CoCl_2 \cdot 6H_2O$, and $NiSO_4 \cdot 6H_2O$.

* * * * *